(12) United States Patent
Watanabe et al.

(10) Patent No.: US 12,718,967 B2
(45) Date of Patent: Aug. 25, 2026

(54) CONDUCTIVE COMPOSITION AND METHOD OF PRODUCING SAME, METHOD OF RECORDING CONDUCTIVE IMAGE, AND CONDUCTIVE IMAGE

(71) Applicant: CANON KABUSHIKI KAISHA, Tokyo (JP)

(72) Inventors: Taiki Watanabe, Tokyo (JP); Masanori Seki, Kanagawa (JP); Yuma Kobayashi, Kanagawa (JP); Maya Yashima, Kanagawa (JP); Taihei Mukaide, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 18/829,759

(22) Filed: Sep. 10, 2024

(65) Prior Publication Data

US 2024/0428963 A1 Dec. 26, 2024

Related U.S. Application Data

(63) Continuation of application No. PCT/JP2023/008703, filed on Mar. 8, 2023.

(30) Foreign Application Priority Data

Mar. 10, 2022 (JP) ................................ 2022-037460
Feb. 20, 2023 (JP) ................................ 2023-023925

(51) Int. Cl.
*H01B 1/22* (2006.01)
*C09D 11/52* (2014.01)

(52) U.S. Cl.
CPC ............... *H01B 1/22* (2013.01); *C09D 11/52* (2013.01)

(58) Field of Classification Search
CPC ..... B41J 2/01; B22F 1/00; B22F 1/054; B22F 1/102; B22F 9/24; B41M 5/00;
(Continued)

(56) References Cited

U.S. PATENT DOCUMENTS 6,632,380 B1 10/2003 Wessling
2012/0193619 A1* 8/2012 Taka ..................... H10K 50/16 257/40

(Continued)

FOREIGN PATENT DOCUMENTS

CN 105451917 A 3/2016
EP 1002322 A1 5/2000

(Continued)

OTHER PUBLICATIONS

Sato, M., et. al., "Studies on Preparations of Reforming Agents and their Applications (IV)", Tohoku Industrial Research Institute Report, Oct. 1974, p. 15-19, No. 4.

(Continued)

*Primary Examiner* — Anh T Vo
(74) *Attorney, Agent, or Firm* — Canon U.S.A., Inc., IP Division

(57) ABSTRACT

Provided is a conductive composition, which is excellent in dispersion stability of a metal particle, and with which a conductive image excellent in conductivity can be easily recorded by only performing simple posttreatment. The conductive composition is a conductive composition including: a metal particle; and a compound having a repeating structure represented by the following general formula (1) and having a weight-average molecular weight of from 1,000 to 100,000, wherein at least a part of a surface of the metal particle is coated with the compound, and a metal atom in the metal particle and a nitrogen atom in the compound are chemically bonded to each other.

(Continued)

(1)

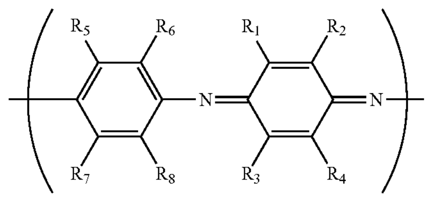

25 Claims, 4 Drawing Sheets

(58) Field of Classification Search
CPC .............. B41M 5/0047; B41M 5/0052; B41M 5/0058; C09D 11/102; C09D 11/322; C08L 79/00; H01B 1/00; H01B 1/22
See application file for complete search history.

(56) References Cited

U.S. PATENT DOCUMENTS

2015/0201491 A1* 7/2015 Tatsuta .................. B33Y 80/00 361/748
2016/0137865 A1 5/2016 Kwon
2016/0216621 A1* 7/2016 Miyamoto ............. G03G 5/144

FOREIGN PATENT DOCUMENTS

| | | | |
|---|---|---|---|
| EP | 2995399 | A1 | 3/2016 |
| JP | 2001511581 | A | 8/2001 |
| JP | 2005327910 | A | 11/2005 |
| JP | 2008081550 | A | 4/2008 |
| JP | 2016527664 | A | 9/2016 |
| KR | 100547271 | B1 | 1/2006 |
| KR | 20140145811 | A | 12/2014 |
| TW | 201513131 | A | 4/2015 |
| WO | 9905687 | A1 | 2/1999 |
| WO | 2002010262 | A1 | 2/2002 |
| WO | 2011074606 | A1 | 6/2011 |
| WO | 2014200288 | A1 | 12/2014 |

OTHER PUBLICATIONS

Hosny, N.M., et. al., “Synthesis, structural and optical properties of Eskolaite nanoparticles derived from Cr doped polyanthranilic acid (CrPANA)”, Journal of Molecular Structure, 2016, pp. 117-122, No. 1122.

* cited by examiner

CONDUCTIVE COMPOSITION AND METHOD OF PRODUCING SAME, METHOD OF RECORDING CONDUCTIVE IMAGE, AND CONDUCTIVE IMAGE

CROSS-REFERENCE TO RELATED APPLICATIONS

This application is a Continuation of International Patent Application No. PCT/JP2023/008703, filed Mar. 8, 2023, which claims the benefit of Japanese Patent Application No. 2022-037460, filed Mar. 10, 2022, and Japanese Patent Application No. 2023-023925, filed Feb. 20, 2023, all of which are hereby incorporated by reference herein in their entirety.

BACKGROUND

Field of the Disclosure

The present disclosure relates to a conductive composition and a method of producing the conductive composition, a method of recording a conductive image, and a conductive image.

Description of the Related Art

As a material for recording and forming a film-shaped conductive image, such as a pattern or a circuit that shows conductivity, a liquid conductive composition including a metal particle is used. In order to stably disperse the metal particle in such conductive composition and maintain dispersion stability thereof, a treatment agent that may adsorb to the metal particle needs to be used. However, such treatment agent is a component that does not contribute to the conductivity, and hence has needed to be removed from a recorded conductive image by being subjected to firing treatment at high temperature or washing treatment using a solvent. However, along with the diversification of a base material on which the conductive image is recorded, a conductive composition for which the firing treatment at high temperature is not needed is required.

For example, there is a proposal of a transparent electrode containing a metal particle and a π-conjugated polymer such as polythiophene (Japanese Patent Application Laid-Open No. 2005-327910). In addition, there is a proposal of an ink for a wiring material containing a metal colloid generated by reducing a metal ion from a mixed solution of the metal ion and a conductive polymer aqueous solution of polyaniline or the like (Japanese Patent Application Laid-Open No. 2008-081550).

However, in an ink prepared through use of the metal particle coated with the π-conjugated polymer proposed in Japanese Patent Application Laid-Open No. 2005-327910, the dispersion state of the metal particle is liable to become unstable, resulting in insufficient dispersion stability, and a large amount of an aggregated metal particle is contained in a recorded conductive image. In addition, a component that does not contribute to the conductivity cannot be sufficiently removed by only performing simple posttreatment such as drying without performing firing at high temperature after the ink is applied to a base material, and hence it has been difficult to record an image excellent in conductivity. In addition, in the metal colloid proposed in Japanese Patent Application Laid-Open No. 2008-081550, due to a weak interaction with a conductive polymer, the dispersion stability of a metal particle is insufficient, and it has been difficult to record an image excellent in conductivity.

SUMMARY

Accordingly, an object of the present disclosure is to provide a conductive composition, which is excellent in dispersion stability of a metal particle, and with which a conductive image excellent in conductivity can be easily recorded by only performing simple posttreatment. In addition, another object of the present disclosure is to provide a method of producing the conductive composition, a method of recording a conductive image with the conductive composition and a conductive image.

That is, according to the present disclosure, there is provided a conductive composition including: a metal particle; and a compound having a repeating structure represented by the following general formula (1) and having a weight-average molecular weight of from 1,000 to 100,000, wherein at least a part of a surface of the metal particle is coated with the compound, and a metal atom in the metal particle and a nitrogen atom in the compound are chemically bonded to each other:

(1)

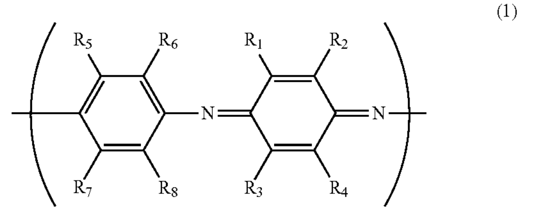

in the general formula (1), $R_1$ to $R_4$ each independently represent a hydrogen atom, an alkyl group, an alkoxy group or a hydrophilic group and at least one of $R_1$ to $R_4$ represents the hydrophilic group, $R_5$ to $R_8$ each independently represent a hydrogen atom, an alkyl group, an alkoxy group or the hydrophilic group and at least one of $R_5$ to $R_8$ represents the hydrophilic group, and the hydrophilic group is at least one kind selected from the group consisting of: a carboxylic acid group; a sulfonic acid group; a phosphoric acid group; and a phosphonic acid group.

Further features of the present disclosure will become apparent from the following description of exemplary embodiments with reference to the attached drawings.

DETAILED DESCRIPTION

Figure 1:
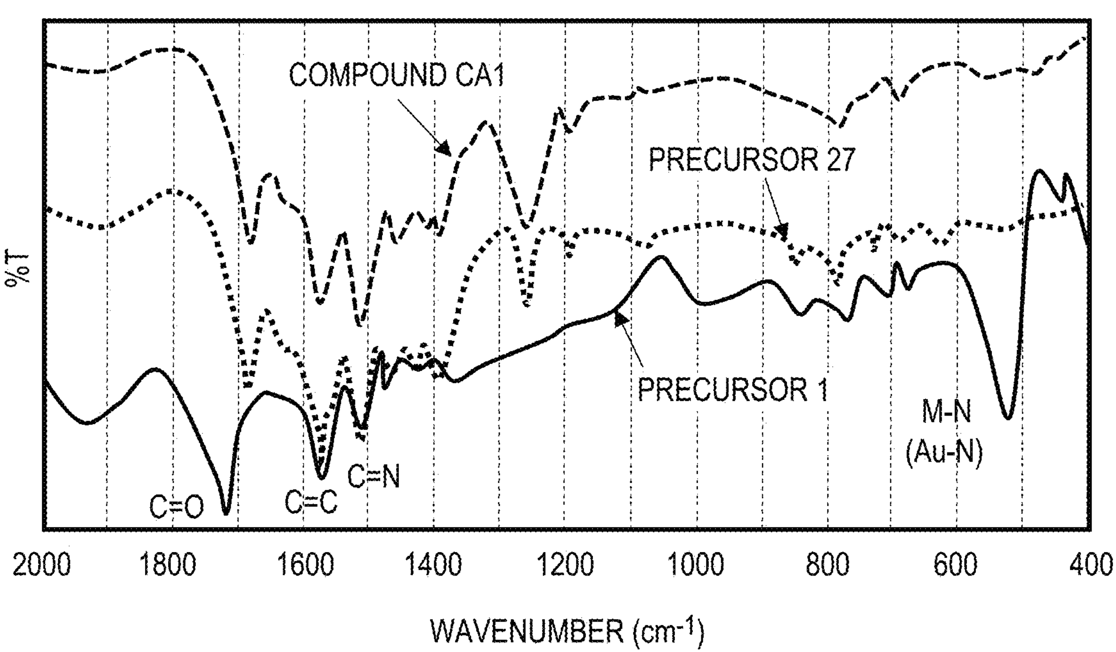
FIG. 1 shows infrared absorption (IR) spectra of a compound CA1, a precursor 1 and a precursor 27.

The present disclosure is described in more detail below by way of exemplary embodiments. In the present disclosure, when a compound is a salt, the salt is present as dissociated ions in a composition, but the expression "contain a salt" is used for convenience. In the present disclosure, a conductive composition is sometimes simply referred to as "composition" or "ink". In addition, the "image" in the present disclosure encompasses, for example, a letter, a photograph, a line drawing, a wiring and a pattern and the "recording" or "forming" refers to expressing a desirable "image" on a base material. Physical property values are values at normal temperature (25° C.), unless otherwise stated.

The inventors of the present disclosure have made various investigations, and as a result, have found that it is effective to use, as a treatment agent for a metal particle, a specific compound including: a specific structure that functions as an adsorption or chemical bond site to the metal particle; and a hydrophilic group for dispersing the metal particle. In addition, the inventors have found a repeating structure represented by the following formula (2) as the specific structure that functions as the adsorption or chemical bond (covalent bond) site to the metal particle. That is, the metal particle and a compound having the repeating structure represented by the following formula (2) having a hydrophilic group are used in combination. The inventors have found that, with the above-mentioned configuration, a conductive composition, which is excellent in dispersion stability of a metal particle, and with which a conductive image excellent in conductivity can be recorded by only performing simple posttreatment such as drying, is obtained. Thus, the inventors have reached the present disclosure.

(2)

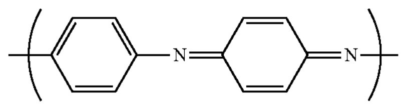

<Conductive Composition>

A conductive composition of the present disclosure contains a metal particle and a compound having a repeating structure represented by the general formula (1) and having a weight-average molecular weight of from 1,000 to 100,000. In addition, at least a part of a surface of the metal particle is coated with the compound, and a metal atom in the metal particle and a nitrogen atom in the compound are chemically bonded to each other. It is preferable that the conductive composition be liquid at 25° C. Each of components for forming the conductive composition is described below.

(Metal Particle)

The conductive composition contains the metal particle. The metal particle is preferably formed of at least one kind of metal selected from the group consisting of: nickel; palladium; platinum; copper; silver; and gold. The metal for forming the metal particle is preferably platinum, copper, silver or gold, more preferably silver or gold, particularly preferably gold out of those metals. The content (% by mass) of the metal particle in the conductive composition is preferably 1.0% by mass or more to 50.0% by mass or less with respect to the total mass of the composition.

The metal particle is present in the conductive composition in a dispersed state. The volume-based 50% cumulative particle diameter of the metal particle in the conductive composition is preferably 1 nm or more to 100 nm or less, more preferably 5 nm or more to 50 nm or less from the viewpoint of dispersion stability of the metal particle. The "volume-based 50% cumulative particle diameter" is hereinafter also simply referred to as "average particle diameter." When the average particle diameter of the metal particle is less than 5 nm, the number of metal particles per unit mass is increased in the conductive composition. As a result, a plurality of metal particles are liable to collide with each other to aggregate, and the dispersion stability of the metal particle may be liable to be decreased. Meanwhile, when the average particle diameter of the metal particle is more than 100 nm, the metal particle is liable to precipitate in the conductive composition, and the dispersion stability of the metal particle may be liable to be decreased. The volume-based 50% cumulative particle diameter (average particle diameter) of the metal particle may be measured by a dynamic light scattering method. When the metal particle is formed of gold or silver, a particle diameter of the metal particle can be simply determined by measuring a UV-visible absorption spectrum.

The shape of the metal particle is preferably a substantially spherical shape. In the present disclosure, when the ratio of a short diameter "b" of the metal particle to a long diameter "a" thereof is 0.9 or more, the shape of the metal particle is described to be a substantially spherical shape. The ratio of the short diameter "b" of the metal particle to the long diameter "a" thereof is used as an indicator indicating that the metal particle has a substantially spherical shape. In order to determine the ratio of the short diameter "b" of the metal particle to the long diameter "a" thereof, the long diameter "a" and short diameter "b" of the metal particle are first measured. Specifically, after the conductive composition (dispersion liquid or ink) is appropriately diluted with water, the metal particle is photographed with a transmission electron microscope (TEM) or a scanning electron microscope (SEM). Then, the longest diameter passing through the particle center of gravity of the smallest unit for forming the metal particle is defined as a long diameter "a", and the shortest diameter passing therethrough is defined as a short diameter "b". The ratio of the short diameter "b" to the long diameter "a" is calculated from the long diameter "a" and the short diameter "b" measured in this manner. Then, an average value of the ratios of the short diameters "b" of 30 metal particles to the long diameters "a" thereof is defined as the ratio of the short diameter "b" of the metal particle to the long diameter "a" thereof. The ratio of the short diameter "b" of the metal particle to the long diameter "a" thereof is preferably 0.9 or more. In addition, the ratio of the short diameter "b" to the long diameter "a" is theoretically 1.0 or less.

(Compound Having Repeating Structure Represented by General Formula (1))

The conductive composition contains a compound having a repeating structure represented by the following general formula (1) and having a weight-average molecular weight of from 1,000 to 100,000 (hereinafter also simply referred to as "compound"). The compound is a "treatment agent" for dispersing a metal particle. The weight-average molecular weight of the compound is a value in terms of polystyrene measured by gel permeation chromatography (GPC). The number ("n") of the repeating structures each represented by the general formula (1) in the compound is preferably 1 or more to 500 or less, more preferably 2 or more to 400 or less. In addition, the compound is preferably water-soluble. As used herein, the fact that the compound is "water-soluble" means that the compound is present in a liquid composition at 25° C. in a state of not forming a particle having a particle diameter that can be measured.

(1)

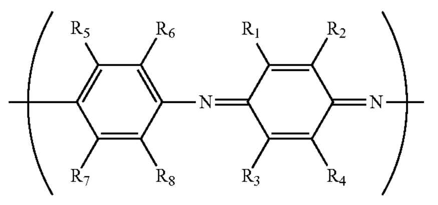

In the general formula (1), $R_1$ to $R_4$ each independently represent a hydrogen atom, an alkyl group, an alkoxy group or a hydrophilic group and at least one of $R_1$ to $R_4$ represents the hydrophilic group, $R_5$ to $R_8$ each independently represent a hydrogen atom, an alkyl group, an alkoxy group or the hydrophilic group and at least one of $R_5$ to $R_8$ represents the hydrophilic group, and the hydrophilic group is at least one kind selected from the group consisting of: a carboxylic acid group; a sulfonic acid group; a phosphoric acid group; and a phosphonic acid group.

The repeating structure represented by the general formula (1) in the compound can be recognized by measuring the infrared absorption spectrum of the compound. For example, the infrared absorption spectrum of the compound has an absorption peak at about 1,600 $cm^{-1}$ derived from a C═C bond, an absorption peak at about 1,500 $cm^{-1}$ derived from a C═N bond and an absorption peak derived from a hydrophilic group. When the hydrophilic group is a carboxylic acid group, an absorption peak derived from a C═O bond of the carboxylic acid group is present at about 1,710 $cm^{-1}$. When the hydrophilic group is a sulfonic acid group, an absorption peak derived from a S═O bond of the sulfonic acid group is present at about 1,200 $cm^{-1}$.

The repeating structure represented by the general formula (1) interacts with the surface of the metal particle through use of an electron on a nitrogen atom of quinonediimine or through use of the reactivity of nitrogen. It has been known that, when the metal particle has positive charge, a chemical bond between a metal and the nitrogen atom of an imine, called metal doping, occurs. The chemical bond is described in a literature such as Journal of Molecular Structure, 1122 (2016), pp. 117-122. According to the literature, in an infrared absorption spectrum, the presence or absence of a M-N bond can be recognized based on the presence or absence of an absorption peak at from about 450 $cm^{-1}$ to about 600 $cm^{-1}$ derived from a bond between a metal atom (M) and a nitrogen atom (N) of an imine (hereinafter also referred to as "M-N bond").

In the general formula (1), $R_1$ to $R_4$ each independently represent a hydrogen atom, an alkyl group, an alkoxy group or a hydrophilic group, and $R_5$ to $R_8$ each independently represent a hydrogen atom, an alkyl group, an alkoxy group or a hydrophilic group. The alkyl group may be linear or branched, and preferably has 1 to 5 carbon atoms. Examples of the alkyl group may include a methyl group, an ethyl group, a propyl group and an isopropyl group. The alkoxy group may be linear or branched, and preferably has 1 to 5 carbon atoms. Examples of the alkoxy group may include a methoxy group and an ethoxy group.

The hydrophilic group is at least one kind selected from the group consisting of: a carboxylic acid group; a sulfonic acid group; a phosphoric acid group; and a phosphonic acid group. The hydrophilic group may be in a form of a salt. Examples of a cation for forming the salt may include an alkali metal ion, an ammonium ion and an organic ammonium ion. Examples of the alkali metal ion may include ions of lithium, sodium and potassium. Examples of the organic ammonium ion may include ions of an alkylamine and an alkanolamine. When at least one of $R_1$ to $R_4$ represents a hydrophilic group and at least one of $R_5$ to $R_8$ represents a hydrophilic group, those hydrophilic groups may be identical to or different from each other.

A hydrogen atom bonded to a carbon atom for forming the alkyl group or the alkoxy group represented by each of $R_1$ to $R_4$ and $R_5$ to $R_8$ may be substituted with a substituent, such as a halogen atom, a hydroxy group or an alkylsiloxane group. However, when the substituent is sterically too large or the electron-donating property of the substituent is too strong, the properties of the nitrogen atom of the imine may become less suitable for a chemical bond to the metal particle.

In the general formula (1), it is preferable that any one of $R_1$ to $R_4$ represent a carboxylic acid group or a sulfonic acid group, and all the others represent hydrogen atoms. Further, in the general formula (1), it is preferable that $R_2$ represent a carboxylic acid group or a sulfonic acid group, and $R_1$, $R_3$ and $R_4$ each represent a hydrogen atom.

It is only required that the compound have the repeating structure represented by the general formula (1), and there is no particular limitation on an end or other structures that the compound may have. The ratio (% by mass) of the repeating structure represented by the general formula (1) constituting the compound is preferably 50.0% by mass or more with respect to the total mass of the compound. Through use of the compound having such characteristics, the metal particle is effectively coated with the compound, and hence a conductive composition excellent in dispersion stability of the metal particle can be obtained.

The ratio (% by mass) of the repeating structure represented by the general formula (1) constituting the compound can be determined from an infrared absorption (IR) spectrum of a conductive composition containing the compound. Specifically, the above-mentioned ratio (% by mass) can be approximately calculated from an absorption peak intensity at 1,500 $cm^{-1}$ derived from C═N and an absorption peak intensity at from about 1,220 $cm^{-1}$ to about 1,250 $cm^{-1}$ derived from C—NH in the IR spectrum.

A method of determining the above-mentioned ratio (% by mass) is specifically described. Here, the following compound is taken as an example: a compound that has a structure represented by the following general formula (1a) at one end thereof, has a structure represented by the following general formula (1b) and the repeating structure represented by the general formula (1) and has a structure represented by the following general formula (1d) at the other end thereof. In the IR spectrum of the conductive composition containing the compound, an absorption peak derived from C═N and an absorption peak derived from C—NH are recognized. The repeating structure represented by the general formula (1) includes two C═N bonds, and hence the intensity of the absorption peak derived from C═N is doubled. Thus, in such a compound that an intensity ratio between absorption peaks derived from C═N and C—NH is determined to be, for example, 2:1, a ratio (on a mass basis) between the repeating structures represented by the general formula (1) and the general formula (1b) can be estimated to be 1:1. The molecular weights of the structure represented by the general formula (1a) and the structure represented by the general formula (1d) present at the ends are subtracted from the molecular weight of the compound measured by gel permeation chromatography (GPC) to determine the molecular weight of the repeating structure portion. The molecular weight of the repeating structure represented by the general formula (1b) and the molecular weight of the repeating structure represented by the general formula (1) can be determined based on the ratio obtained above from the molecular weight of the repeating structure portion. From those molecular weights, the ratio (% by mass) of the repeating structure represented by the general formula (1) constituting the compound can be calculated.

The end of the compound preferably has a structure corresponding to a part of the repeating structure represented by the general formula (1). Specific examples thereof may include the structure represented by the following general formula (1a) and the structure represented by the following general formula (1d). In addition, the structure represented by the following general formula (1b) may be present between one end and the repeating structure represented by the general formula (1). Similarly, the structure represented by the following general formula (1c) may be present between the repeating structure represented by the general formula (1) and the other end. It is preferable that "m" and "m", which represent the numbers of the repeating structures of the general formula (1b) and the general formula (1c), each independently represent 0 or more to 100 or less.

(1a)

(1b)

(1c)

(1d)

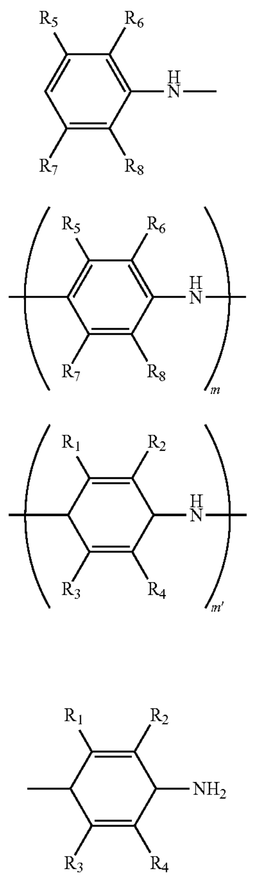

As described above, it is required that the metal atom (M) in the metal particle and at least one nitrogen atom (N) in the compound be chemically bonded to each other. Here, for example, aniline black having a repeating structure represented by the following formula (3) is known as a compound containing quinonediimine.

(3)

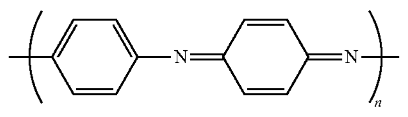

Aniline black represented by the formula (3) is an insulator. Meanwhile, its proton type forms (emeraldine salts) represented by the following general formulae (4) and (5) are each a conductor. Through a chemical reaction between the metal atom (M) (metal atom having positive charge) and a nitrogen atom (N) in quinonediimine, a conductive compound having a form similar to the proton type is formed. Through use of a metal particle chemically bonded to such conductive compound, a conductive composition that can easily form a conductive image excellent in conductivity can be provided.

(4)

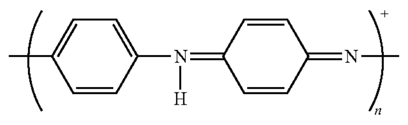

(5)

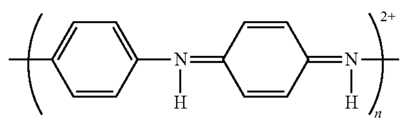

The bond between the metal atom (M) and the nitrogen atom (N) (hereinafter also referred to as "M-N bond") can be identified by measuring an infrared absorption spectrum. When the M-N bond is formed, an absorption peak of the infrared absorption spectrum derived from M-N stretching vibration appears in a wavenumber band of from 450 $cm^{-1}$ to 600 $cm^{-1}$. The method of identifying the M-N bond is described in, for example, Tohoku Industrial Research Institute Report, No. 4, October 1974, p. 15-19.

Commercially available products or compounds synthesized by known methods may each be used as the compound having the repeating structure represented by the general formula (1). Suitable examples of the commercially available products may include "aquaPASS" series (product name) (manufactured by Mitsubishi Chemical Corporation, water-soluble conductive polymer (polymer of sulfonic acid-substituted aniline)). For example, the infrared absorption spectrum of "aquaPASS-01X" has an absorption peak at from 1,550 $cm^{-1}$ to 1,650 $cm^{-1}$ derived from a C═C bond, an absorption peak at about 1,200 $cm^{-1}$ derived from a C═N bond and an absorption peak at about 1,300 $cm^{-1}$ derived from a S═O bond.

A compound including a desirable substituent (group represented by each of $R^1$ to $R_4$ and $R_5$ to $R_8$ in the general formula (1)) may be obtained by synthesis. Examples of a method of synthesizing the compound may include known synthesis methods, such as oxidative polymerization and electropolymerization of a compound having an aminobenzene skeleton. Details of the oxidation polymerization are described in, for example, Journal of Molecular Structure, 1122 (2016), pp. 117-122.

Examples of an oxidizing agent to be used in the oxidative polymerization of the compound having an aminobenzene skeleton may include persulfates and redox initiators. Specific examples thereof may include: persulfates, such as ammonium persulfate, persulfuric acid, sodium persulfate and potassium persulfate; and redox initiators, such as hydrogen peroxide, ferric chloride, ferric sulfate, potassium bichromate, potassium permanganate and a hydrogen peroxide-ferrous salt. It is preferable that the usage amount of the oxidizing agent be set to, for example, 0.01 mol or more to 10 mol or less with respect to 1 mol of the compound having an aminobenzene skeleton. For example, a compound having a benzene skeleton having a substituent at a 4-position, a thiol compound, a disulfide compound or an α-methylstyrene dimer may be used as a control agent for controlling the molecular weight of the resultant compound.

A synthesis flow in the case of producing a compound having a carboxylic acid group by oxidative polymerization is described below. First, anthranilic acid is dissolved in hydrochloric acid, and then an aqueous solution of ammonium persulfate is added dropwise at 25° C. (room temperature) thereto, followed by stirring at 25° C. for 4 days. The generated solid is filtered, washed with water and dried. Thus, a black solid can be obtained. The molecular weight of the resultant black solid can be measured and can be recognized to be water-soluble by gel permeation chromatography (GPC). Further, an infrared absorption spectrum is measured, and the presence of quinonediimine can be recognized based on an absorption peak at about 1,560 $cm^{-1}$ derived from a C═C bond and an absorption peak at about 1,500 $cm^{-1}$ derived from a C═N bond. Further, the presence of a carboxylic acid group can be recognized based on an absorption peak at about 1,700 $cm^{-1}$ derived from a C═O bond.

Specific examples of the compound having the repeating structure represented by the general formula (1) are described below. Needless to say, in the present disclosure, the compound having the repeating structure represented by the general formula (1) is not limited to exemplary compounds shown below as long as the compound has the structure of the general formula (1) and satisfies the definition thereof. The case in which the hydrophilic group is a carboxylic acid group is exemplified below.

(1-1)

(1-2)

(1-3)

(1-4)

(1-5)

(1-6)

(1-7)

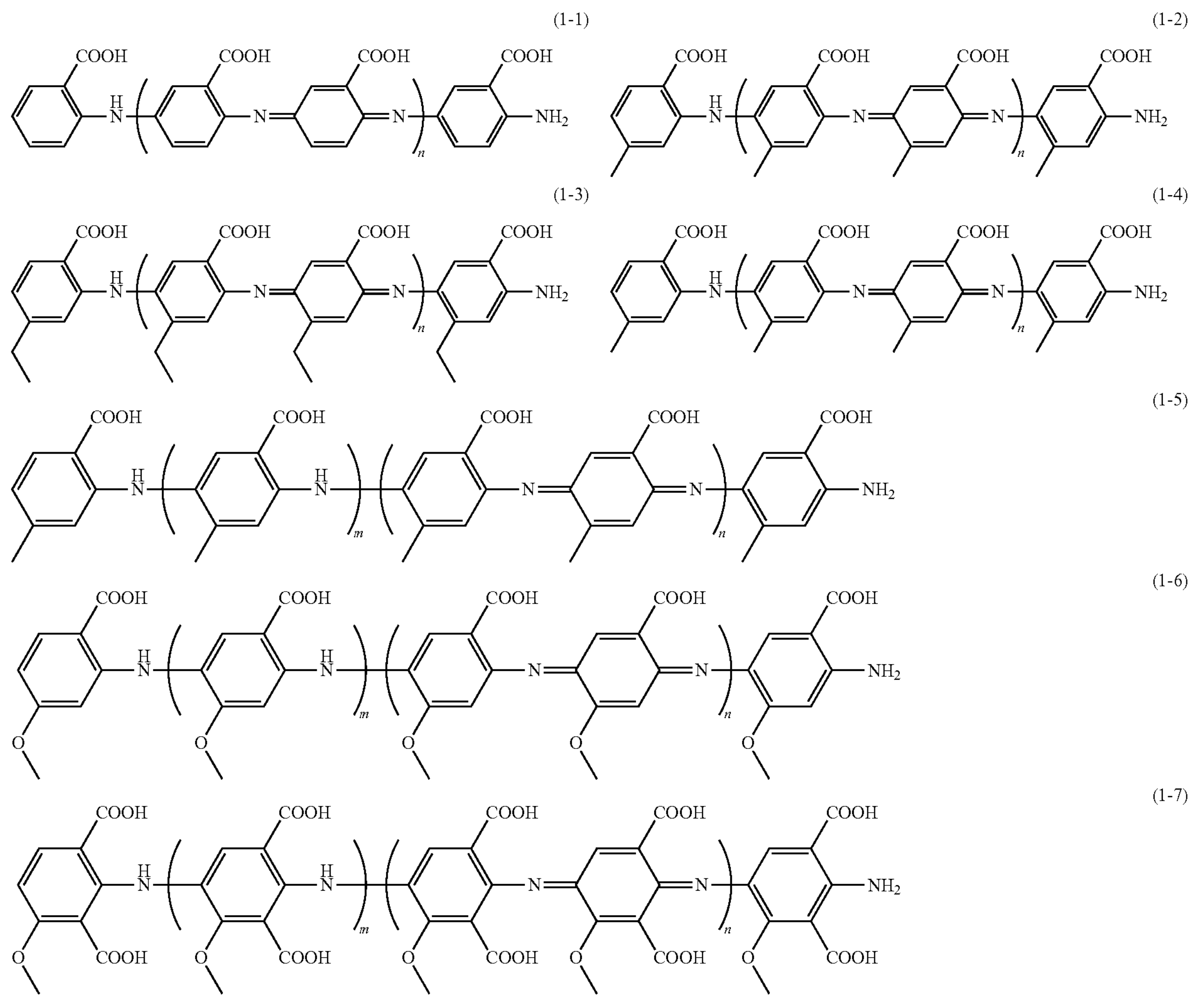

The content (% by mass) of the compound in the conductive composition is preferably 0.00001% by mass or more to 1.0% by mass or less, more preferably 0.001% by mass or more to 0.1% by mass or less with respect to the total mass of the composition.

It is preferable that the metal atom in the metal particle and the nitrogen atom in the compound be chemically bonded to each other and that the metal particle be appropriately coated with the compound. Specifically, it is preferable that the surface of the metal particle be uniformly coated with the compound. For this purpose, the content (% by mass) of the compound in the conductive composition is preferably 0.001 times or more to 0.100 times or less, more preferably 0.005 times or more to 0.075 times or less in terms of mass ratio with respect to the content (% by mass) of the metal particle. When the above-mentioned mass ratio is less than 0.005 times, the compound is too small in amount to sufficiently coat the surface of the metal particle, and a region in which the compound does not adhere to the surface of the metal particle is liable to be present. Then, when a plurality of metal particles collide with each other in the conductive composition, the metal particles may coalesce or aggregate to increase the particle diameter of each of the metal particles. As a result, the dispersion stability may not be sufficiently obtained. Meanwhile, when the above-mentioned mass ratio is more than 0.075 times, the volume occupied by the compound in the conductive image recorded with the conductive composition becomes larger. As a result, conductivity may not be sufficiently obtained. In addition, when the conductive composition is ejected from a liquid ejection head of an inkjet system, the ejection property may be slightly decreased.

When the particle diameter of the metal particle is determined, a surface area per metal particle can be calculated. Accordingly, when an occupied area per molecule of the compound can be estimated, the number of molecules for coating the surface of one metal particle can be calculated. The occupied area may be determined as an estimated value by setting the diameter of an atom to 1.5 Å, calculating a sectional area thereof and multiplying the sectional area by the number of the atoms of the compound.

In addition, a saturated adsorption amount for coating the metal particle may be estimated, and the estimated amount may be used as a guideline addition amount. Specifically, the adsorption amount is plotted with respect to the addition amount of the compound. When the obtained plot (adsorption isotherm) is a curve in accordance with a Langmuir-type adsorption isotherm, a region in which, even when the addition amount is increased, the adsorption amount is not increased and is hence saturated is present. Accordingly, the adsorption amount in the region can be regarded as the saturated adsorption amount.

Whether or not the metal atom in the metal particle and the nitrogen atom in the compound are chemically bonded to each other and at least a part of the surface of the metal particle is coated with the compound may be recognized by a zeta potential of the metal particle. A metal particle not coated with the compound typically has a zeta (ζ) potential of 0 mV or more. That is, the zeta potential shows zero or a positive value having a small absolute value (value of from about 0 mV to about +3 mV). In contrast, the zeta potential of the metal particle in which at least a part of the particle surface is coated with the compound is less than 0. That is, the zeta potential indicates a negative value (specifically, a value of −1 mV or less). This is because the hydrophilic group in the repeating structure represented by the general formula (1) undergoes ionic dissociation to become an anion. The zeta potential may be measured with a zeta potential measurement apparatus. In the measurement of the zeta potential, in order to remove the compound that does not coat the metal particle, it is preferable to use a sample prepared by subjecting the conductive composition to centrifugation treatment, removing the supernatant to provide a wet cake and then diluting the wet cake with water.

From the viewpoint of dispersion stability, the zeta potential of the chemically bonded metal particle is preferably −30 mV or less (which is a negative value and is 30 mV or more in terms of absolute value). When the zeta potential is more than −30 mV (which is a negative value and is less than 30 mV in terms of absolute value), the coating of the metal particle with the compound is small. As a result, the metal particles are liable to aggregate, and hence the dispersion stability may not be sufficiently obtained. In addition, the chart of the zeta potential has a single peak top. In addition, the shape of the peak is sharp, and the half width of the peak tends to be small.

(Liquid Medium)

The conductive composition may further contain a liquid medium. As the liquid medium, any of a non-aqueous medium and an aqueous medium may be used. An example of the non-aqueous medium may be a liquid medium including an organic solvent, such as heptane or petroleum ether. The non-aqueous medium is free of water. The aqueous medium contains water, and may further contain various organic solvents. The conductive composition preferably further contains the aqueous medium.

The aqueous medium is water or a mixed medium of water as a main component and a protic organic solvent or an aprotic organic solvent used in combination. As the organic solvent, an organic solvent miscible with water at any ratio (water-miscible organic solvent) or an organic solvent soluble in water at any ratio (water-soluble organic solvent) is preferably used. Of those, a uniform mixed medium containing 50% by mass or more of water is preferably used as the aqueous medium. As the water, deionized water (ion-exchanged water) or ultrapure water is preferably used.

The protic organic solvent is an organic solvent having a hydrogen atom (acidic hydrogen atom) bonded to an oxygen atom or a nitrogen atom. The aprotic organic solvent is an organic solvent free of an acidic hydrogen atom. Examples of the organic solvent may include alcohols, (poly)alkylene glycols, glycol ethers, glycol ether esters, carboxylic acid amides, ketones, ketoalcohols, cyclic ethers, nitrogen-containing solvents and sulfur-containing solvents.

Examples of the aqueous medium may include water, a mixed solvent of water and an alcohol, a mixed solvent of water and a (poly)alkylene glycol and a mixed solvent of water and a nitrogen-containing solvent. The content (% by mass) of water in the conductive composition is preferably 10.0% by mass or more to 90.0% by mass or less, more preferably 50.0% by mass or more to 90.0% by mass or less with respect to the total mass of the conductive composition.

The content (% by mass) of the water-soluble organic solvent in the conductive composition is preferably 5.0% by mass or more to 90.0% by mass or less, more preferably 10.0% by mass or more to 50.0% by mass or less with respect to the total mass of the conductive composition.

(Resin)

The conductive composition may further contain a resin. The resin is different from the compound having the repeating structure represented by the general formula (1) and having a weight-average molecular weight of from 1,000 to 100,000. When the resin is added to the conductive composition, the physical properties, such as viscosity and surface tension, of the conductive composition can be easily adjusted. In addition, when the resin is added to the conductive composition, the performance of a conductive image to be recorded with the conductive composition, such as hardness, flexibility and adhesiveness to the base material, can also be adjusted. The kind of the resin to be incorporated into the conductive composition is preferably selected so as to correspond to the material for forming the base material to which the conductive composition is applied. For example, when the resin to be added to the conductive composition and the resin material for forming the base material having so-called "SP values" close to each other are selected, it is conceived that the adhesiveness of the conductive image to the base material may be enhanced. Suitable resin combinations are described later.

The content (% by mass) of the resin in the conductive composition is preferably 0.01% by mass or more to 20.0% by mass or less, more preferably 0.05% by mass or more to 20.0% by mass or less with respect to the total mass of the conductive composition. The content is particularly preferably 0.1% by mass or more to 10.0% by mass or less out of those ranges. When the content of the resin in the conductive composition is too small, the degree of adjustment of the physical properties of the conductive composition and the degree of adjustment of the performance of the conductive image obtained by adding the resin may be decreased. Meanwhile, when the content of the resin in the conductive composition is too large, the conductivity of the conductive image may not be sufficiently obtained.

Examples of the resin may include polyester, polyurethane, polyolefin, polystyrene, acrylic, polyvinyl chloride, polyvinyl acetate, polyvinylpyrrolidone, polyamide, polyimide, epoxy, polyvinyl alcohol and a polysaccharide. Of those, at least one kind of resin selected from the group consisting of: polyester; polyurethane; polyolefin; polyvinyl acetate; and polyamide is more preferable. The resin may be a resin formed of a plurality of kinds of resins described above (e.g., copolymer or composite resin).

The resin may include an ionic group (anionic group or cationic group) or may not include an ionic group. A resin including an anionic group or a resin free of an ionic group is preferable because such resin is less liable to influence the repulsive force of negative charge of the metal particle to which the above-mentioned compound is chemically bonded, and the resin can stably coexist with the metal particle in the conductive composition. In the case of a conductive composition containing an aqueous liquid medium, a resin including an anionic group or a resin free of an ionic group may be particularly suitably used. In addition, when a resin including a cationic group is used, it is preferable that the content of the resin in the conductive composition be determined in consideration of the repulsive force with respect to the metal particle. The weight-average molecular weight of the resin is preferably 2,000 or more to 100,000 or less. The weight-average molecular weight of the resin is a value in terms of polystyrene measured by gel permeation chromatography (GPC).

The resin may be a soluble resin that can be dissolved in a liquid medium or a resin particle that is dispersed in a liquid medium, but the resin is more preferably a resin particle. As used herein, the expression "resin is soluble" means that, when the resin is neutralized with an alkali in an amount equivalent to its acid number, the resin is present in a liquid medium in a state of not forming a particle having a particle diameter that can be measured by a dynamic light scattering method. Whether or not the resin is soluble can be determined in accordance with the method described below. Here, a conductive composition containing an aqueous liquid medium and a resin including an anionic group are described as examples, but the same determination can be made also when the liquid medium is non-aqueous or when the resin includes a cationic group except that the components are replaced by the corresponding components.

First, a liquid (resin solid content: 10% by mass) containing a resin neutralized with an alkali (sodium hydroxide, potassium hydroxide or the like) equivalent to its acid number is prepared. Next, the prepared liquid is diluted 10 times (on a volume basis) with pure water to prepare a sample solution. Then, in the case where the particle diameter of the resin in the sample solution is measured by the dynamic light scattering method, when the particle having a particle diameter is not measured, it can be determined that the resin is soluble. The measurement conditions in this case may be set to, for example, SetZero of 30 seconds, the number of times of measurement of 3 times and a measurement time of 180 seconds. In addition, a particle size analyzer (e.g., product name: "UPA-EX150", manufactured by Nikkiso Co., Ltd.) based on a dynamic light scattering method or the like may be used as a particle size distribution measurement apparatus. Needless to say, the particle size distribution measurement apparatus, measurement conditions and the like to be used are not limited to the foregoing.

(Other Additive)

The conductive composition may further contain such an organic compound that is solid at normal temperature (25° C.), for example, as described below as required: a polyhydric alcohol, such as trimethylolpropane or trimethylolethane; or urea or a urea derivative such as ethylene urea. In addition, the conductive composition may further contain any one of various additives, such as a surfactant, a pH adjuster, a rust inhibitor, an antiseptic, an antifungal agent, an antioxidant, an anti-reducing agent, an evaporation accelerator and a chelating agent, as required.

As the surfactant, for example, any of anionic, cationic and nonionic surfactants may be used. The content (% by mass) of the surfactant in the conductive composition is preferably 0.1% by mass or more to 5.0% by mass or less, more preferably 0.1% by mass or more to 2.0% by mass or less with respect to the total mass of the conductive composition.

As the surfactant, nonionic surfactants, such as a polyoxyethylene alkyl ether, a polyoxyethylene fatty acid ester, a polyoxyethylene alkyl phenyl ether, a polyoxyethylene-polyoxypropylene block copolymer and an acetylene glycol-based compound, are each preferably used.

<Method of Producing Conductive Composition>

Next, a method of producing the above-mentioned conductive composition is described. The conductive composition in a state in which a metal atom in the metal particle and a nitrogen atom in the compound are chemically bonded to each other may be suitably produced by the following method. The method of producing the conductive composition includes: a first step of heating a metal salt and the compound to 40° C. or more to 150° C. or less in an aqueous medium to form a precursor in which a metal atom in the metal salt and a nitrogen atom in the compound are chemically bonded to each other; and a second step of reducing the formed precursor.

According to the investigations made by the inventors of the present disclosure, in order to chemically bond the metal atom and the nitrogen atom to each other, it is preferable that the metal salt and the compound be heated to 40° C. or more to 150° C. or less to be caused to react with each other. This is conceived to be consistent with the following general fact. That is, an alkali metal such as lithium has high reactivity, and hence reacts with a nitrogen gas at room temperature (25° C.) to generate a nitride of the alkali metal (such as lithium nitride). In contrast, heating is required for causing a metal having reactivity that is not as high as that of the alkali metal to react with the nitrogen gas.

[First Step]

In the first step, the metal salt and the compound are heated to 40° C. or more to 150° C. or less in the aqueous medium to be caused to react with each other. Specifically, after the compound is added to an aqueous solution of the metal salt, the resultant is heated to a range of from 40° C. or more to 150° C. or less under stirring. The heating temperature may be determined in accordance with a liquid medium. When a liquid medium formed of water alone is used, the heating temperature is set to preferably 40° C. or more, more preferably 50° C. or more, and is also set to preferably 100° C. or less that is the boiling point of water in consideration of a reflux temperature. In addition, when a liquid medium that is a mixed medium of water and an organic solvent (suitably having a boiling point higher than that of water) is used, the heating temperature is set to preferably 40° C. or more to 150° C. or less in consideration of the azeotropy of the water and the organic solvent. Thus, a precursor in which a metal atom in the metal salt and a nitrogen atom in the compound are chemically bonded to each other can be formed.

The formed precursor is a compound in which a metal atom (M) and a nitrogen atom (N) are chemically bonded to each other. The precursor has, for example, a structure represented by the following general formula (6) or (7).

(6)

(7)

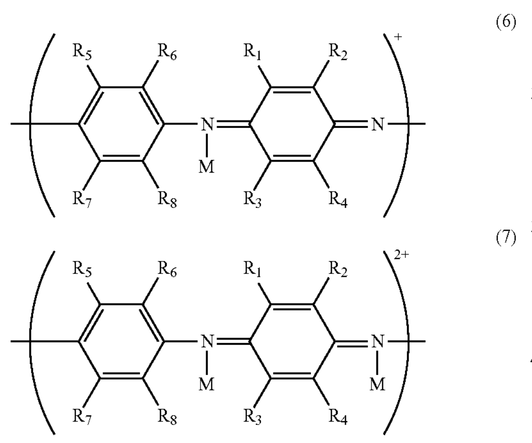

In the general formulae (6) and (7), "M"s each independently represent a metal atom, $R_1$ to $R_4$ each independently represent a hydrogen atom, an alkyl group, an alkoxy group or a hydrophilic group and at least one of $R_1$ to $R_4$ represents the hydrophilic group, $R_5$ to $R_8$ each independently represent a hydrogen atom, an alkyl group, an alkoxy group or a hydrophilic group and at least one of $R_5$ to $R_8$ represents the hydrophilic group, and the hydrophilic group is at least one kind selected from the group consisting of: a carboxylic acid group; a sulfonic acid group; a phosphoric acid group; and a phosphonic acid group.

Whether or not the precursor has been formed can be recognized based on the presence or absence of the bond between the metal atom (M) and the nitrogen atom (N). The bond between the metal atom (M) and the nitrogen atom (N) (hereinafter also referred to as "M-N bond") can be identified by measuring an infrared absorption spectrum. When a M-N bond is newly formed, an absorption peak in an infrared absorption spectrum derived from M-N stretching vibration appears in a wavenumber band of from 450 $cm^{-1}$ to 600 $cm^{-1}$. Whether or not the precursor has been formed can be determined based on the presence or absence of the absorption peak.

[Second Step]

In the second step, the precursor obtained in the first step is reduced. Thus, there can be obtained an intended conductive composition containing a metal particle in a state in which a metal atom in the metal particle and a nitrogen atom in the compound are chemically bonded to each other.

[Components to be Used in Production Methods]

Components to be used in the above-mentioned production method are described.

(Aqueous Medium)

As an aqueous medium, the above-mentioned aqueous medium that may be incorporated into the conductive composition may be used. That is, only water or a mixed medium of water as a main component and a protic organic solvent or an aprotic organic solvent used in combination may be used. As the organic solvent, an organic solvent miscible with water at any ratio (water-miscible organic solvent) or an organic solvent soluble in water at any ratio (water-soluble organic solvent) is preferably used. Of those, a uniform mixed medium containing 50% by mass or more of water is preferably used as the aqueous medium. As the water, deionized water (ion-exchanged water) or ultrapure water is preferably used.

(Metal Salt)

Examples of the metal salt may include: a metal salt including a metal ion and an inorganic anion species; a metal salt including a metal ion and an organic anion species; and a metal salt including a metal ion and an inorganic/organic anion species. As the metal ion, ions of metals that may form metal particles, such as nickel, palladium, platinum, copper, silver and gold, may each be used. Examples of the inorganic anion species may include anions of an oxide, a halogen, carbonic acid and nitric acid. Examples of the organic anion species may include anions of carboxylic acids, such as formic acid and acetic acid.

Specific examples of the metal salt may include: nickel compounds, such as nickel (II) chloride and nickel (II) nitride; palladium compounds, such as palladium (II) chloride, palladium (II) acetate and palladium (II) oxide; platinum compounds, such as platinum (II) chloride and platinum (IV) oxide; copper compounds, such as copper (I) chloride, copper (II) chloride, copper (I) oxide and copper (II) oxide; silver compounds, such as silver (I) chloride, silver nitride, silver oxide and silver acetate; and gold compounds, such as gold (III) oxide, gold (I) chloride, tetragold octachloride, gold (III) chloride, gold (III) bromide, gold (III) fluoride, gold (V) fluoride, gold (I) hydroxide and gold (III) hydroxide.

In recent years, the following possibility has been pointed out: resources of a material, such as a noble metal or a rare metal, which is used in an electronic device and the like, may be depleted in several decades when the material is kept being used without any measure. Such material is called a critical material, and in order not to deplete the resource, an effort of recovering those resources from a used noble metal product or a waste electronic device to recycle those resources has been performed in each country. Recycling of a noble metal, such as platinum, gold or silver, out of such resources has been advanced as compared to other resources, and a regeneration technology has started to be established. As a method of regenerating gold, there is given, for example, a method including removing any other metal from a recovered waste product, dissolving and leaching gold with aqua regia or an organic solvent, followed by recrystallization of gold with a reducing agent to increase its purity and further melting the resultant to form a lump having removed organic matter therefrom. When the recovered noble metal is reused as a product, purity guarantee is needed. For example, in the case of gold, a high purity of 99.99% needs to be guaranteed.

From such viewpoint, a recovered metal salt recovered from a metal waste liquid is also preferably used as the metal salt. For example, when a conductive composition containing a gold particle as the metal particle is produced, chloroauric (III) acid utilizing the recovered gold may be used. Chloroauric (III) acid may be prepared by drying a gold-aqua regia solution generated in the middle of the above-mentioned method of regenerating gold.

When the conductive composition containing a gold particle as the metal particle is produced, the regenerated chloroauric (III) acid may be used as one of starting raw materials. Gold has a high reducing property, and hence even when the regenerated chloroauric (III) acid contains another metal impurity, the gold particle is preferentially formed. Accordingly, high purity guarantee is unnecessary for the regenerated chloroauric (III) acid. The purity of chloroauric (III) acid is preferably 90% or more, more preferably 95% or more. In a regeneration process for gold, a step in association with purity guarantee can be omitted to suppress a raw material cost.

In addition, when a conductive composition containing a silver particle as the metal particle is produced, high purity guarantee is unnecessary for silver (I) nitrate that may be used as one of starting raw materials. The purity of silver (I) nitrate is preferably 90% or more, more preferably 95% or more. In a regeneration process for silver, a step in association with purity guarantee can be omitted to suppress a raw material cost.

Silver (I) nitrate may be recovered from a waste in accordance with a known method. For example, when a dichromate salt is added to a filtrate obtained by adding nitric acid to a waste liquid containing silver to acidulate the liquid and separating a precipitate, silver dichromate is generated as a precipitate. Silver (I) nitrate may be recovered by dissolving the precipitate of silver dichromate in hot dilute nitric acid, followed by treatment with a $NO_3$-type anion-exchange resin.

(Reducing Agent)

A reducing agent is preferably used for reducing the metal salt. Examples of the reducing agent may include: alcohols each having a primary hydroxy group, such as methanol, ethanol, 1-propanol and ethylene glycol; alcohols each having a secondary hydroxy group, such as 2-propanol and 2-butanol; alcohols each having a primary hydroxy group and a secondary hydroxy group, such as glycerin; thiols; aldehydes, such as formaldehyde and acetaldehyde; sugars, such as glucose, fructose, glyceraldehyde, lactose, arabinose and maltose; organic acids, such as citric acid, tannic acid and ascorbic acid, and salts thereof; borohydrides and salts thereof; and hydrazines, such as hydrazine, an allylhydrazine and hydrazine sulfate. As an anion for forming a salt of the organic acid or the borohydride, there may be given, for example: ions of alkali metals, such as lithium, sodium and potassium; ions of alkaline earth metals, such as calcium and magnesium; an ammonium ion; and organic ammonium ions.

Of those, organic acids and salts thereof are each preferably used as the reducing agent. The organic acids and salts thereof each reduce a metal salt and adhere to the surface of the metal particle to be formed, to thereby enable a repulsive force to such a degree as not to cause aggregation or coalescence of the metal particles to be generated. As the organic acids and salts thereof, for example, ascorbic acid and salts thereof and citric acid and salts thereof are preferable. Of those, for example, an ascorbic acid salt and a citric acid salt are more preferable.

In addition, a compound, such as polyvinylpyrrolidone, polyvinyl alcohol, polyethylene glycol, gelatin, starch, dextrin, carboxymethyl cellulose, methyl cellulose or ethyl cellulose, may be used as the reducing agent. Those compounds each also reduce a metal salt and adhere to the surface of the metal particle to be formed, to thereby enable an auxiliary repulsive force for preventing aggregation or coalescence of the metal particles from being caused to be generated in the same manner as in the above-mentioned organic acids and salts thereof.

The usage amount of the reducing agent only needs to be appropriately set in accordance with, for example, the kind of the metal, the concentration of the metal salt, the size (particle diameter) of the metal particle to be formed and a temperature and a stirring force when the reducing agent is added. In the first step, the metal salt is preferably reduced while being vigorously stirred. In addition, in the first step, the metal salt is preferably reduced under a heating condition and the metal salt is more preferably reduced while the liquid medium is refluxed. For example, when the reflux is performed through use of a liquid medium formed of water alone, the temperature of a bath (e.g., an oil bath) in which a reaction vessel is placed is set to preferably 115° C. or more to 200° C. or less in order to adjust the heating temperature to 40° C. or more to 100° C. or less.

The metal particle only reduced with the reducing agent and not coated with the treatment agent shows a value of a zeta potential in accordance with the kind of the reducing agent. For example, in Examples to be described below, the gold particle is formed by using citric acid as the reducing agent. The zeta potential of the gold particle having citric acid adhering thereto is about-40 mV. However, the reducing agent such as citric acid has a weak adhesive force to the metal particle, and hence a conductive composition in which a metal particle is continuously stably dispersed is not achieved by only causing the reducing agent such as citric acid to adhere thereto.

<Method of Recording Conductive Image>

Next, a method of recording a conductive image is described. The method of recording a conductive image of the present disclosure includes a step of applying the above-mentioned conductive composition to a base material. When the conductive composition is applied to the base material, a desirable conductive image can be obtained. As a method of applying the conductive composition to the base material, there may be given, for example, an ink jet method, a flexo method and a spin coating method. The conductive composition is preferably applied to the base material by an ink jet method out of those methods. The ink jet method is a method including ejecting the conductive composition from an ejection head of an ink jet system to apply the composition to the base material such as a recording medium. A system of ejecting the conductive composition from the ejection head is, for example, a system involving applying mechanical energy to the conductive composition or a system involving applying thermal energy to the conductive composition. The method of applying the conductive composition to the base material by the ink jet method may be a known method except that the above-mentioned conductive composition is used.

When the conductive image is recorded (formed) by ejecting the conductive composition from the ejection head of the ink jet system to apply the composition to the base material, a conductive composition whose surface tension and viscosity are appropriately controlled is preferably used.

In this case, specifically, the content (% by mass) of the metal particle in the conductive composition is preferably 5.0% by mass or more to 30.0% by mass or less with respect to the total mass of the composition. When the content of the metal particle in the conductive composition is less than 5.0% by mass, it may be required to apply the conductive composition a plurality of times in order to record a film-shaped conductive image. Meanwhile, when the content of the metal particle in the conductive composition is more than 30.0% by mass, an ejection orifice may be liable to be clogged due to the high viscosity when the conductive composition is ejected from an ejection head of an ink jet system.

The surface tension of the conductive composition at 25° C. is preferably 10 mN/m or more to 60 mN/m or less, more preferably 20 mN/m or more to 60 mN/m or less, particularly preferably 30 mN/m or more to 50 mN/m or less. The viscosity of the conductive composition at 25° C. is preferably 1.0 mPa's or more to 10 mPa's or less, more preferably 1.0 mPa's or more to 5 mPa's or less. The pH of the conductive composition at 25° C. is preferably 3.0 or more to 9.0 or less, more preferably 5.0 or more to 9.0 or less.

The method of recording a conductive image may further include a step of drying the conductive composition applied to the base material. When the above-mentioned conductive composition is used, the conductive image having excellent conductivity can be recorded by only performing drying at low temperature such as normal temperature (25° C.) even when the composition is not dried at a high temperature of, for example, 100° C. or more. The conductive composition applied to the base material may be dried by, for example, air blowing or heating, but may be dried without utilizing these methods, that is, naturally dried. The conductive composition applied to the base material may be dried at a temperature of preferably 20° C. or more to 120° C. or less, more preferably 20° C. or more to 50° C. or less. When the drying temperature is less than 20° C., the time period required for the drying may become longer. When the drying time is shortened, conductivity of the conductive image to be recorded easily becomes higher. When the base material has a high heat-resistant temperature, the drying temperature may be increased to the heat-resistant temperature. However, when the drying temperature is set to be too high, the base material may be deformed. In the recording method of the present disclosure, after the application of the conductive composition to the base material, a step of heating or sintering the conductive composition or a step of curing the conductive composition by irradiation with, for example, an active energy ray may not be performed.

<Conductive Image>

A conductive image of the present disclosure is a conductive image including a base material and a conductive layer formed on the base material. The conductive layer contains a metal particle and the above-mentioned compound. At least a part of the surface of the metal particle is coated with the compound, and a metal atom in the metal particle and a nitrogen atom in the compound are chemically bonded to each other. The conductive image of the present disclosure is suitably a conductive image recorded on a base material and is an image formed of the above-mentioned conductive composition.

(Base Material)

The base material may be any base material on which the conductive image may be recorded by, for example, drying the applied conductive composition. The conductive composition expresses conductivity even through drying at low temperature, and hence a base material having a low heat-resistant temperature may be used. For example, glass, paper, a resin material, ceramics and silicon are each preferably used as the base material. Examples of the resin material may include a biocompatible material and a synthetic resin. The resin material preferably has a plate shape or a sheet shape.

As the resin material, a biocompatible material may be used. The biocompatible material refers to a material that does not have harmful effects on a living body, and is a material having characteristics of being inert to a chemical reaction and a biological defense reaction, not easily causing decomposition, deterioration and elution in a living body, not easily adsorbing other components, and having both flexibility and strength. As the biocompatible material, biodegradable plastics, such as polyhydroxybutyric acid, poly ($\alpha$-hydroxy ester), poly($\beta$-hydroxy ester), polycyanoacrylate, polyanhydride, polyketone, poly(orthoester), poly-$\varepsilon$-caprolactone, polyacetal, poly(iminocarbonate) and polyphosphazene, proteins, such as polypeptide, gelatin, collagen and fibroin, and polysaccharides, such as cellulose and chitosan, are each preferable. Of those, a biocompatible material formed of at least one kind selected from the group consisting of: gelatin; collagen; fibroin; cellulose; and chitosan is preferable.

As the resin material, a synthetic resin may be used. As the synthetic resin, a resin, such as polyester, polyurethane, polyolefin, polystyrene, acrylic, polyvinyl chloride, polyvinyl acetate, polyamide, polyimide, polycarbonate, epoxy or an acrylonitrile-butadiene-styrene copolymer (ABS), is preferable. Of those, a synthetic resin material formed of at least one kind selected from the group consisting of: polyester; polyolefin; polyimide; and polycarbonate is preferable. Those synthetic resin materials are each suitable as a resin to be used in a substrate such as a flat panel, and each particularly preferably have a plate shape or a sheet shape.

As described above, the kind of the resin to be incorporated into the conductive composition is preferably selected so as to correspond to the material for forming the base material to which the conductive composition is applied. For example, when the resin to be added to the conductive composition and the resin material for forming the base material having so-called "SP values" close to each other are selected, it is conceived that the adhesiveness of the conductive image to the base material may be enhanced.

Suitable combinations of the resin for forming the base material and the resin to be incorporated into the conductive composition are described below. When a base material formed of a polyester resin is used, resins, such as polyester, polyolefin, acrylic, polyvinyl acetate and polyamide, are each preferable as the resin to be incorporated into the conductive composition. When a base material formed of a polyurethane resin is used, a resin such as polyamide is preferable as the resin to be incorporated into the conductive composition. When a base material formed of a polyolefin resin is used, resins, such as polyurethane, polyolefin, acrylic and polyvinyl acetate, are each preferable as the resin to be incorporated into the conductive composition. When a base material formed of a polyvinyl chloride resin is used, resins, such as polyester, polyolefin, polyvinyl acetate and polyimide, are each preferable as the resin to be incorporated into the conductive composition. When a base material formed of a polyamide resin is used, resins, such as polyurethane, acrylic and polyamide, are each preferable as the resin to be incorporated into the conductive composition. When a base material formed of a polyimide resin is used, a resin such as polyamide is preferable as the resin to be incorporated into the conductive composition. When a base material formed of a polycarbonate resin is used, resins, such as polyurethane, polyolefin, acrylic and polyvinyl acetate, are each preferable as the resin to be incorporated into the conductive composition. When a base material formed of an acrylic resin is used, a resin such as acrylic is preferable as the resin to be incorporated into the conductive composition. When a base material formed of an epoxy resin is used, a resin such as polyamide is preferable as the resin to be incorporated into the conductive composition. In addition to the resin materials, when a base material formed of glass is used, a resin such as polyamide is preferable as the resin to be incorporated into the conductive composition.

EXAMPLES

Next, the present disclosure is described in more detail by way of Examples and Comparative Examples. However, the present disclosure is by no means limited to Examples below without departing from the gist of the present disclosure. In the description of the amounts of components, "part(s)" and "%" are by mass unless otherwise specified.

Synthesis of Compound

Compounds having repeating structures represented by the following formulae (8) to (11) were synthesized by the following procedure. An infrared absorption (IR) spectrum was measured with a Fourier transform infrared spectrometer (product name: "Spectrum One-B", manufactured by PerkinElmer, Inc.).

(8)

(9)

(10)

(11)

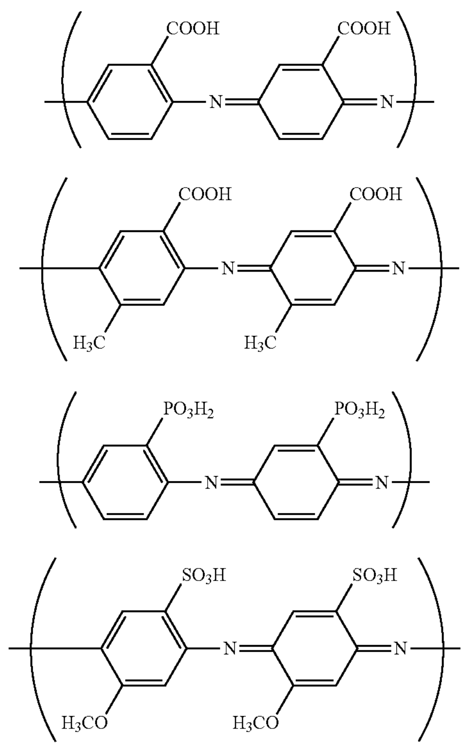

(Compound CA1)

A compound CA1 having the repeating structure represented by the formula (8) was synthesized by a method described in Journal of Molecular Structure, 1122 (2016), pp. 117-122. In a 300 mL recovery flask, 5.76 g of anthranilic acid (manufactured by Kishida Chemical Co., Ltd.), 15 mL of concentrated hydrochloric acid (Kishida Chemical Co., Ltd.) and 90 mL of ion-exchanged water were placed so that anthranilic acid was dissolved. Thus, a mixed solution was obtained. To the resultant mixed solution, a solution obtained by dissolving 11.97 g of ammonium peroxodisulfate (manufactured by Kishida Chemical Co., Ltd.) in 60 mL of ion-exchanged water was added dropwise under an environment at 25° C., followed by stirring for 18 hours. The precipitated black solid was filtered and washed with water 5 times to provide 2.38 g of a compound CA1. The weight-average molecular weight of the compound in terms of polystyrene measured by gel permeation chromatography (GPC) was 10,000. An infrared absorption spectrum was measured, and an absorption peak at about 1,700 $cm^{-1}$ derived from a carboxylic acid group, an absorption peak at about 1,585 $cm^{-1}$ derived from a C═C bond and an absorption peak at about 1,510 $cm^{-1}$ derived from a C—N bond were recognized. The infrared absorption spectrum of the compound CA1 is shown in FIG. 1.

(Compound CA2)

A compound CA2 having the repeating structure represented by the formula (9) was obtained in the same manner as in the case of the compound CA1 described above except that 2-amino-4-methyl-benzoic acid (manufactured by Kishida Chemical Co., Ltd.) was used instead of anthranilic acid. The weight-average molecular weight of the resultant compound CA2 was 20,000. An infrared absorption spectrum was measured, and an absorption peak at about 1,700 $cm^{-1}$ derived from a carboxylic acid group, an absorption peak at about 1,600 $cm^{-1}$ derived from a C═C bond and an absorption peak at about 1,500 $cm^{-1}$ derived from a C═N bond were recognized.

(Compound PA)

A compound PA having the repeating structure represented by the formula (10) was obtained in the same manner as in the case of the compound CA1 described above except that p-(2-aminophenyl)phosphonic acid (manufactured by Kishida Chemical Co., Ltd.) was used instead of anthranilic acid. The weight-average molecular weight of the resultant compound PA was 20,000. An infrared absorption spectrum was measured, and an absorption peak at about 1,195 $cm^{-1}$ derived from a phosphonic acid group, an absorption peak at about 1,560 $cm^{-1}$ derived from a C═C bond and an absorption peak at about 1,500 $cm^{-1}$ derived from a C═N bond were recognized.

(Compound SA)

A compound SA having the repeating structure represented by the formula (11) was obtained in the same manner as in the case of the compound CA1 described above except that 2-amino-4-methoxy-p-benzenesulfonic acid (manufactured by Kishida Chemical Co., Ltd.) was used instead of anthranilic acid. The weight-average molecular weight of the resultant compound SA was 20,000. An infrared absorption spectrum was measured, and an absorption peak at about 1,200 $cm^{-1}$ derived from a sulfonic acid group, an absorption peak at about 1,600 $cm^{-1}$ derived from a C═C bond and an absorption peak at about 1,500 $cm^{-1}$ derived from a C═N bond were recognized.

<Method of Analyzing Conductive Composition>

An infrared absorption spectrum was measured with a Fourier transform infrared spectrometer (product name: "Spectrum One-B", manufactured by PerkinElmer, Inc.). An average particle diameter (volume-based 50% cumulative particle diameter, D50) of a metal particle in a conductive composition was measured with a small-angle X-ray scattering apparatus (product name: "Nano-Viewer", manufactured by Rigaku Corporation). Measurement conditions at this time were set to a wavelength (λ) of 0.154 nm and an incident angle of 1.7°. The maximum absorption wavelength of the conductive composition was measured with a UV-visible near-infrared spectrophotometer (product name: "UV-3600", manufactured by Shimadzu Corporation). A zeta potential of the metal particle in the conductive composition was measured with a zeta potentiometer (product name: "Zetasizer Nano", manufactured by Malvern). At this time, the produced conductive composition was subjected to centrifugation treatment and the supernatant was removed so that a wet cake was obtained. After that, a sample prepared by diluting the wet cake with ultrapure water so as to have a concentration suitable for the measurement was used as a measurement target. The zeta potentials of a gold particle and a silver particle generated by reducing gold (III) chloride tetrahydrate and silver (I) nitrate (all of which were manufactured by Kishida Chemical Co., Ltd.) with trisodium citrate dihydrate were 1 mV and 0 mV, respectively.

(Production of Conductive Composition (Dispersion Liquid)>

Conductive compositions (dispersion liquids) were produced by the following methods. A metal particle in each of conductive compositions (dispersion liquids) produced in Examples D1 to D26 had a "substantially spherical" shape. The mass ratio of the compound to the metal particle may be hereinafter referred to as "compound/metal particle."

Example D1: Conductive Composition D1

1 g of chloroauric (III) acid tetrahydrate was dissolved in 40 mL of ultrapure water to provide an aqueous solution of chloroauric acid. After the aqueous solution was heated to 50° C., 20 mg of the compound CA1 ("compound/metal particle"-0.042 times) was added thereto, and the resultant was subjected to a reaction under stirring at 50° C. for 15 hours to provide a reaction liquid containing a precursor 1. As a result of the measurement of the infrared absorption spectrum of the resultant precursor 1, an absorption peak at about 520 $cm^{-1}$ derived from a M-N(gold atom (Au)—N) bond and an absorption peak at about 1,575 $cm^{-1}$ derived from a C═C bond were recognized. Further, an absorption peak at about 1,515 $cm^{-1}$ derived from a C═N bond and an absorption peak at about 1,710 $cm^{-1}$ derived from a C═O bond were recognized. The infrared absorption spectrum of the precursor 1 is shown in FIG. 1.

The entire amount of the reaction liquid containing the precursor 1 obtained above, 1 g of chloroauric (III) acid tetrahydrate and 1,300 mL of ultrapure water were heated to reflux, and 1.16 g of trisodium citrate dihydrate was added thereto, followed by stirring for 2 hours. The change in color of the aqueous solution from yellow to red was visually recognized. The aqueous solution was dispensed into 250 mL centrifuge tubes, and was purified by performing centrifugation treatment at 9,000 rpm for 30 minutes with a centrifuge and removing a supernatant subjected to solid-liquid separation. Further, ultrapure water was added thereto, and the above-mentioned purification by the centrifugation treatment was repeated twice. Thus, a conductive composition D1 was obtained.

Example D2: Conductive Composition D2

A reaction liquid containing a precursor 2 was obtained in the same manner as in the case of the precursor 1 described above except that the compound CA2 was used instead of the compound CA1. As a result of the measurement of the infrared absorption spectrum of the resultant precursor 2, an absorption peak at about 520 $cm^{-1}$ derived from a M-N(gold atom (Au)—N) bond and an absorption peak at about 1,570 $cm^{-1}$ derived from a C═C bond were recognized. Further, an absorption peak at about 1,510 $cm^{-1}$ derived from a C═N bond and an absorption peak at about 1,700 $cm^{-1}$ derived from a C═O bond were recognized. A conductive composition D2 was obtained in the same manner as in the case of the conductive composition D1 described above except that the reaction liquid containing the precursor 2 was used instead of the reaction liquid containing the precursor 1.

Example D3: Conductive Composition D3

A reaction liquid containing a precursor 3 was obtained in the same manner as in the case of the precursor 1 described above except that the compound PA was used instead of the compound CA1. As a result of the measurement of the infrared absorption spectrum of the resultant precursor 3, an absorption peak at about 555 $cm^{-1}$ derived from a M-N(gold atom (Au)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,260 $cm^{-1}$ derived from a P═O bond were recognized. A conductive composition D3 was obtained in the same manner as in the case of the conductive composition D1 described above except that the reaction liquid containing the precursor 3 was used instead of the reaction liquid containing the precursor 1.

Example D4: Conductive Composition D4

A reaction liquid containing a precursor 4 was obtained in the same manner as in the case of the precursor 1 described above except that the compound SA was used instead of the compound CA1. As a result of the measurement of the infrared absorption spectrum of the resultant precursor 4, an absorption peak at about 550 $cm^{-1}$ derived from a M-N(gold atom (Au)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,200 $cm^{-1}$ derived from a S═O bond were recognized. A conductive composition D4 was obtained in the same manner as in the case of the conductive composition D1 described above except that the reaction liquid containing the precursor 4 was used instead of the reaction liquid containing the precursor 1.

Example D5: Conductive Composition D5

A reaction liquid containing a precursor 5 was obtained in the same manner as in the case of the precursor 1 described above except that a water-soluble conductive polymer (product name: "aquaPASS-01X", weight-average molecular weight: 15,000, manufactured by Mitsubishi Chemical Corporation) was used instead of the compound CA1. As a result of the measurement of the infrared absorption spectrum of the resultant precursor 5, an absorption peak at about 565 $cm^{-1}$ derived from a M-N(gold atom (Au)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,205 $cm^{-1}$ derived from a S═O bond were recognized. A conductive composition D5 was obtained in the same manner as in the case of the conductive composition D1 described above except that the reaction liquid containing the precursor 5 was used instead of the reaction liquid containing the precursor 1.

Example D6: Conductive Composition D6

1 g of chloroauric (III) acid tetrahydrate was dissolved in 1,000 mL of ultrapure water to provide an aqueous solution of chloroauric acid. After the aqueous solution was heated to 50° C., 20 mg of the compound CA1 ("compound/metal particle"=0.042 times) was added thereto, and the resultant was subjected to a reaction under stirring at 50° C. for 15 hours to provide a reaction liquid containing a precursor 6. As a result of the measurement of the infrared absorption spectrum of the resultant precursor 6, an absorption peak at about 550 $cm^{-1}$ derived from a M-N(gold atom (Au)—N) bond and an absorption peak at about 1,600 $cm^{-1}$ derived from a C═C bond were recognized. Further, an absorption peak at about 1,500 $cm^{-1}$ derived from a C═N bond and an absorption peak at about 1,715 $cm^{-1}$ derived from a C═O bond were recognized.

The entire amount of the reaction liquid containing the precursor 6 obtained above was heated to reflux, and 2.37 g of trisodium citrate dihydrate was added thereto, followed by stirring for 2 hours. The change in color of the aqueous solution from yellow to red was visually recognized. The aqueous solution was dispensed into 250 mL centrifuge tubes, and was purified by performing centrifugation treatment at 9,000 rpm for 30 minutes with a centrifuge and removing a supernatant subjected to solid-liquid separation. Further, ultrapure water was added thereto, and the above-mentioned purification by the centrifugation treatment was repeated twice. Thus, a conductive composition D6 was obtained.

Example D7: Conductive Composition D7

A reaction liquid containing a precursor 7 was obtained in the same manner as in the case of the precursor 6 described above except that the compound PA was used instead of the compound CA1. As a result of the measurement of the infrared absorption spectrum of the resultant precursor 7, an absorption peak at about 555 $cm^{-1}$ derived from a M-N(gold atom (Au)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,290 $cm^{-1}$ derived from a P═O bond were recognized. A conductive composition D7 was obtained in the same manner as in the case of the conductive composition D6 described above except that the reaction liquid containing the precursor 7 was used instead of the reaction liquid containing the precursor 6.

Example D8: Conductive Composition D8

A reaction liquid containing a precursor 8 was obtained in the same manner as in the case of the precursor 6 described above except that the compound SA was used instead of the compound CA1. As a result of the measurement of the infrared absorption spectrum of the resultant precursor 8, an absorption peak at about 590 $cm^{-1}$ derived from a M-N(gold atom (Au)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,200 $cm^{-1}$ derived from a S═O bond were recognized. A conductive composition D8 was obtained in the same manner as in the case of the conductive composition D6 described above except that the reaction liquid containing the precursor 8 was used instead of the reaction liquid containing the precursor 6.

Example D9: Conductive Composition D9

A reaction liquid containing a precursor 9 was obtained in the same manner as in the case of the precursor 6 described above except that a water-soluble conductive polymer (product name: "aquaPASS-01X", weight-average molecular weight: 15,000, manufactured by Mitsubishi Chemical Corporation) was used instead of the compound CA1. As a result of the measurement of the infrared absorption spectrum of the resultant precursor 9, an absorption peak at about 590 $cm^{-1}$ derived from a M-N (gold atom (Au)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,205 $cm^{-1}$ derived from a S═O bond were recognized. A conductive composition D9 was obtained in the same manner as in the case of the conductive composition D6 described above except that the reaction liquid containing the precursor 9 was used instead of the reaction liquid containing the precursor 6.

Example D10: Conductive Composition D10

1 g of chloroauric (III) acid tetrahydrate was dissolved in 1,000 mL of ultrapure water to provide an aqueous solution of chloroauric acid. After the aqueous solution was heated to 30° C., 20 mg of the compound CA1 ("compound/metal particle"=0.042 times) was added thereto, and the resultant was subjected to a reaction under stirring at 30° C. for 15 hours to provide a reaction liquid containing a precursor 10. As a result of the measurement of the infrared absorption spectrum of the resultant precursor 10, an absorption peak at about 550 $cm^{-1}$ derived from a M-N (gold atom (Au)—N) bond and an absorption peak at about 1,600 $cm^{-1}$ derived from a C═C bond were recognized. Further, an absorption peak at about 1,500 $cm^{-1}$ derived from a C═N bond and an absorption peak at about 1,715 $cm^{-1}$ derived from a C═O bond were recognized.

The entire amount of the reaction liquid containing the precursor 10 obtained above was heated to reflux, and 2.37 g of trisodium citrate dihydrate was added thereto, followed by stirring for 2 hours. The change in color of the aqueous solution from yellow to red was visually recognized. The aqueous solution was dispensed into 250 mL centrifuge tubes, and was purified by performing centrifugation treatment at 9,000 rpm for 30 minutes with a centrifuge and removing a supernatant subjected to solid-liquid separation. Further, ultrapure water was added thereto, and the above-mentioned purification by the centrifugation treatment was repeated twice. Thus, a conductive composition D10 was obtained.

Example D11: Conductive Composition D11

1 g of chloroauric (III) acid tetrahydrate was dissolved in 1,000 mL of ultrapure water to provide an aqueous solution of chloroauric acid. After the aqueous solution was heated to 40° C., 20 mg of the compound CA1 ("compound/metal particle"=0.042 times) was added thereto, and the resultant was subjected to a reaction under stirring at 40° C. for 15 hours to provide a reaction liquid containing a precursor 11. As a result of the measurement of the infrared absorption spectrum of the resultant precursor 11, an absorption peak at about 550 $cm^{-1}$ derived from a M-N (gold atom (Au)—N) bond and an absorption peak at about 1,600 $cm^{-1}$ derived from a C═C bond were recognized. Further, an absorption peak at about 1,500 $cm^{-1}$ derived from a C═N bond and an absorption peak at about 1,715 $cm^{-1}$ derived from a C═O bond were recognized.

The entire amount of the reaction liquid containing the precursor 11 obtained above was heated to reflux, and 2.37 g of trisodium citrate dihydrate was added thereto, followed by stirring for 2 hours. The change in color of the aqueous solution from yellow to red was visually recognized. The aqueous solution was dispensed into 250 mL centrifuge tubes, and was purified by performing centrifugation treatment at 9,000 rpm for 30 minutes with a centrifuge and removing a supernatant subjected to solid-liquid separation. Further, ultrapure water was added thereto, and the above-mentioned purification by the centrifugation treatment was repeated twice. Thus, a conductive composition D11 was obtained.

Example D12: Conductive Composition D12

Figure 2:
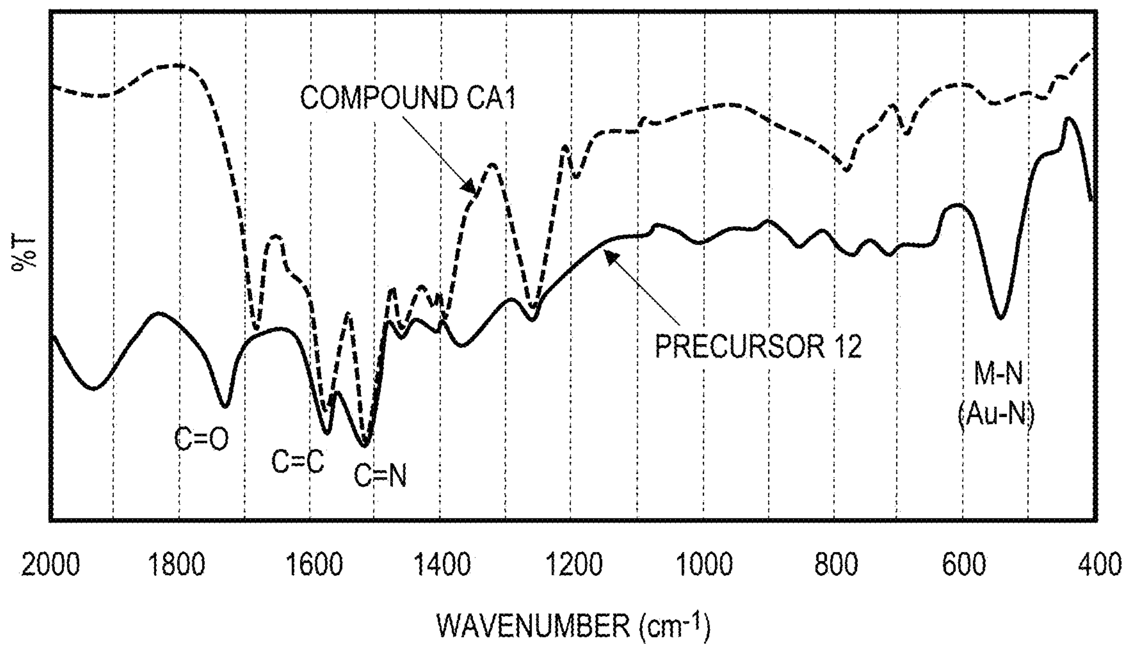
FIG. 2 shows infrared absorption (IR) spectra of the compound CA1 and a precursor 12.

1 g of chloroauric (III) acid tetrahydrate was dissolved in 1,000 mL of ultrapure water to provide an aqueous solution of chloroauric acid. After the aqueous solution was heated to 50° C., 20 mg of the compound CA1 ("compound/metal particle"=0.042 times) was added thereto. Then, the resultant was increased in temperature to 100° C. and subjected to a reaction under stirring for another 30 hours to provide a reaction liquid containing a precursor 12. As a result of the measurement of the infrared absorption spectrum of the resultant precursor 12, an absorption peak at about 550 $cm^{-1}$ derived from a M-N (gold atom (Au)—N) bond and an absorption peak at about 1,575 $cm^{-1}$ derived from a C═C bond were recognized. Further, an absorption peak at about 1,510 $cm^{-1}$ derived from a C═N bond and an absorption peak at about 1,720 $cm^{-1}$ derived from a C═O bond were recognized. The infrared absorption spectrum of the precursor 12 is shown in FIG. 2 together with the infrared absorption spectrum of the compound CA1.

The entire amount of the reaction liquid containing the precursor 12 obtained above was heated to reflux at 100° C., and 2.37 g of trisodium citrate dihydrate was added thereto, followed by stirring for 2 hours. The change in color of the aqueous solution from yellow to red was visually recognized. The aqueous solution was dispensed into 250 mL centrifuge tubes, and was purified by performing centrifugation treatment at 9,000 rpm for 30 minutes with a centrifuge and removing a supernatant subjected to solid-liquid separation. Further, ultrapure water was added thereto, and the above-mentioned purification by the centrifugation treatment was repeated twice. Thus, a conductive composition D12 was obtained.

Example D13: Conductive Composition D13

A reaction liquid containing a precursor 13 was obtained in the same manner as in the case of the precursor 12 described above except that the compound PA was used instead of the compound CA1. As a result of the measurement of the infrared absorption spectrum of the resultant precursor 13, an absorption peak at about 555 $cm^{-1}$ derived from a M-N (gold atom (Au)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,295 $cm^{-1}$ derived from a P═O bond were recognized. A conductive composition D13 was obtained in the same manner as in the case of the conductive composition D12 described above except that the reaction liquid containing the precursor 13 was used instead of the reaction liquid containing the precursor 12.

Example D14: Conductive Composition D14

A reaction liquid containing a precursor 14 was obtained in the same manner as in the case of the precursor 12 described above except that the compound SA was used instead of the compound CA1. As a result of the measurement of the infrared absorption spectrum of the resultant precursor 14, an absorption peak at about 590 $cm^{-1}$ derived from a M-N (gold atom (Au)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,195 $cm^{-1}$ derived from a S═O bond were recognized. A conductive composition D14 was obtained in the same manner as in the case of the conductive composition D12 described above except that the reaction liquid containing the precursor 14 was used instead of the reaction liquid containing the precursor 12.

Example D15: Conductive Composition D15

A reaction liquid containing a precursor 15 was obtained in the same manner as in the case of the precursor 12 described above except that a water-soluble conductive polymer (product name: "aquaPASS-01X", weight-average molecular weight: 15,000, manufactured by Mitsubishi Chemical Corporation) was used instead of the compound CA1. As a result of the measurement of the infrared absorption spectrum of the resultant precursor 15, an absorption peak at about 590 $cm^{-1}$ derived from a M-N (gold atom (Au)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,200 $cm^{-1}$ derived from a S═O bond were recognized. A conductive composition D15 was obtained in the same manner as in the case of the conductive composition D12 described above except that the reaction liquid containing the precursor 15 was used instead of the reaction liquid containing the precursor 12.

Example D16: Conductive Composition D16

A conductive composition was produced through use of gold recovered from a substrate as a raw material. A base material with gold plating was cut out, and was crushed into a size of about 5 mm×about 5 mm to provide a crushed piece for ease of chemical treatment. The obtained crushed piece was immersed in 10% dilute nitric acid for 2 hours so that copper and nickel were dissolved, and gold-plated foil was lifted from the base material. After that, dilute nitric acid was passed through a filter having arranged thereon filter paper to separate the gold-plated foil. Dilute nitric acid showed a blue-green color in which copper and nickel were dissolved. Dilute nitric acid was added to the gold-plated foil on the filter paper, and copper and nickel remaining on a surface of the gold-plated foil were washed out. The obtained gold-plated foil was transferred to another vessel with the filter paper, and an aqua regia solution obtained by mixing 35% hydrochloric acid and 60% nitric acid at 3:1 (volume ratio) was dropped thereinto little by little to dissolve gold. At the time when gold was dissolved, the filter paper was taken out, and the obtained gold-aqua regia solution was filtered so that a fragment of the base material was removed. The filtrate was distilled under reduced pressure while being warmed with an acid-resistant rotary evaporator so that nitric acid, hydrochloric acid and water were removed in the stated order. Thus, chloroauric (III) acid tetrahydrate was obtained.

A reaction liquid containing a precursor 16 was obtained in the same manner as in the case of the conductive composition D12 described above except that the resultant chloroauric (III) acid tetrahydrate was used. As a result of the measurement of the infrared absorption spectrum of the resultant precursor 16, an absorption peak at about 555 $cm^{-1}$ derived from a M-N (gold atom (Au)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,690 $cm^{-1}$ derived from a C═O bond were recognized. A conductive composition D16 was obtained in the same manner as in the case of the conductive composition D12 described above except that the reaction liquid containing the precursor 16 was used instead of the reaction liquid containing the precursor 12.

Example D17: Conductive Composition D17

Figure 3:
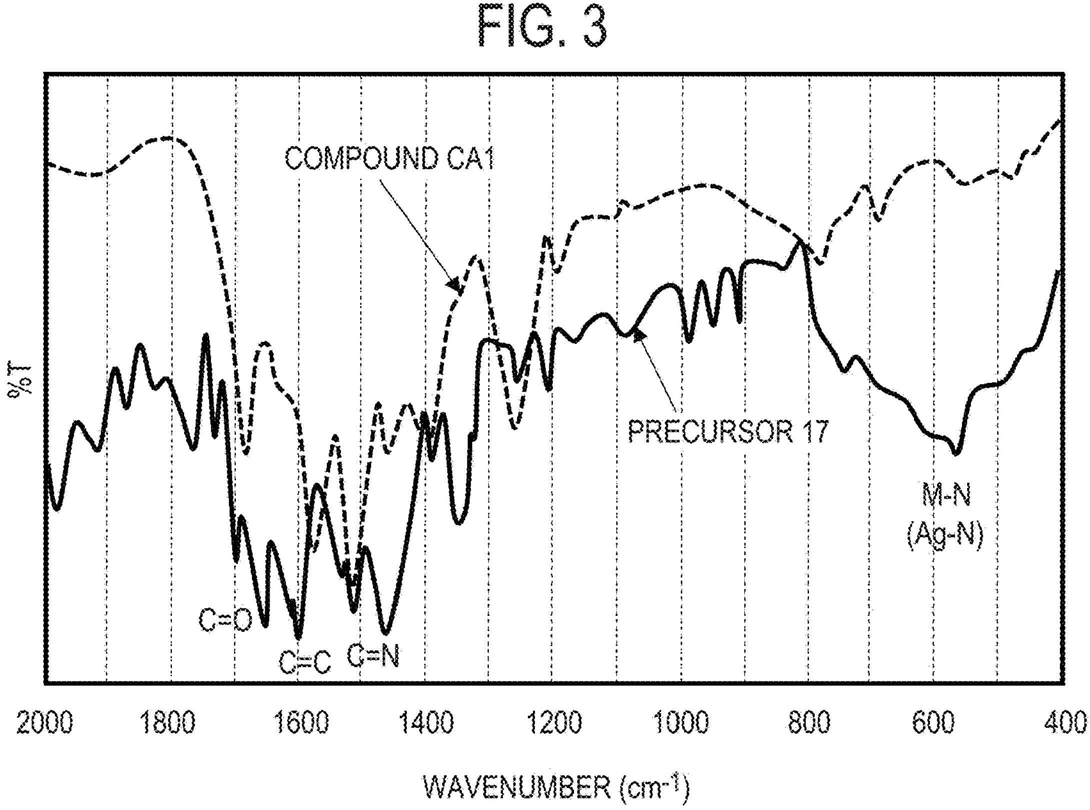
FIG. 3 shows infrared absorption (IR) spectra of the compound CA1 and a precursor 17.

0.34 g of silver (I) nitrate (manufactured by Kishida Chemical Co., Ltd.) was dissolved in 800 mL of ultrapure water to provide an aqueous solution of silver nitrate. After the aqueous solution was heated to 80° C., 10 mg of the compound CA1 ("compound/metal particle"=0.046 times) was added thereto. Then, the resultant was increased in temperature to 100° C. and subjected to a reaction under stirring for another 30 hours to provide a reaction liquid containing a precursor 17. As a result of the measurement of the infrared absorption spectrum of the resultant precursor 17, an absorption peak at about 575 $cm^{-1}$ derived from a M-N (silver atom (Ag)—N) bond and an absorption peak at about 1,600 $cm^{-1}$ derived from a C═C bond were recognized. Further, an absorption peak at from 1,460 $cm^{-1}$ to 1,505 $cm^{-1}$ derived from a C═N bond and an absorption peak at about 1,700 $cm^{-1}$ derived from a C═O bond were recognized. The infrared absorption spectrum of the precursor 17 is shown in FIG. 3 together with the infrared absorption spectrum of the compound CA1.

The entire amount of the reaction liquid containing the precursor 17 was heated to reflux at 100° C., and 0.88 g of trisodium citrate dihydrate was added thereto, followed by stirring for 1 hour. The change in color of the aqueous solution from pale yellow to dark yellow was visually recognized. The aqueous solution was purified with an ultrafiltration apparatus (product name: "TFF Minimate Ultrafiltration System", filter: 30K, manufactured by Pall Corporation) until the electric conductivity of a filtrate reached 2 mS/m. Thus, a conductive composition D17 was obtained.

Example D18: Conductive Composition D18

A reaction liquid containing a precursor 18 was obtained in the same manner as in the case of the precursor 17 described above except that a water-soluble conductive polymer (product name: "aquaPASS-01X", weight-average molecular weight: 15,000, manufactured by Mitsubishi Chemical Corporation) was used instead of the compound CA1. As a result of the measurement of the infrared absorption spectrum of the resultant precursor 18, an absorption peak at about 545 $cm^{-1}$ derived from a M-N (silver atom (Ag)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,200 $cm^{-1}$ derived from a S═O bond were recognized. A conductive composition D18 was obtained in the same manner as in the case of the conductive composition D17 described above except that the reaction liquid containing the precursor 18 was used instead of the reaction liquid containing the precursor 17.

Example D19: Conductive Composition D19

0.34 g of silver (I) nitrate (manufactured by Kishida Chemical Co., Ltd.) was dissolved in 800 mL of ultrapure water to provide an aqueous solution of silver nitrate. After the aqueous solution was heated to 80° C., 10.8 mg of a water-soluble conductive polymer (product name: "aquaPASS-01X", weight-average molecular weight: 15,000, manufactured by Mitsubishi Chemical Corporation) ("compound/metal particle"=0.0025 times) was added thereto. Then, the resultant was increased in temperature to 100° C. and subjected to a reaction under stirring for another 30 hours to provide a reaction liquid containing a precursor 19. As a result of the measurement of the infrared absorption spectrum of the resultant precursor 19, an absorption peak at about 550 $cm^{-1}$ derived from a M-N (silver atom (Ag)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,205 $cm^{-1}$ derived from a S═O bond were recognized.

The entire amount of the reaction liquid containing the precursor 19 was heated to reflux at 100° C., and 0.88 g of trisodium citrate dihydrate was added thereto, followed by stirring for 1 hour. The change in color of the aqueous solution from pale yellow to dark yellow was visually recognized. The aqueous solution was purified with an ultrafiltration apparatus (product name: "TFF Minimate Ultrafiltration System", filter: 30K, manufactured by Pall Corporation) until the electric conductivity of a filtrate reached 2 mS/m. Thus, a conductive composition D19 was obtained.

Example D20: Conductive Composition D20

0.34 g of silver (I) nitrate (manufactured by Kishida Chemical Co., Ltd.) was dissolved in 800 mL of ultrapure water to provide an aqueous solution of silver nitrate. After the aqueous solution was heated to 80° C., 21.6 mg of a water-soluble conductive polymer (product name: "aquaPASS-01X", weight-average molecular weight: 15,000, manufactured by Mitsubishi Chemical Corporation) ("compound/metal particle"=0.005 times) was added thereto. Then, the resultant was increased in temperature to 100° C. and subjected to a reaction under stirring for another 30 hours to provide a reaction liquid containing a precursor 20. As a result of the measurement of the infrared absorption spectrum of the resultant precursor 20, an absorption peak at about 545 $cm^{-1}$ derived from a M-N (silver atom (Ag)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,205 $cm^{-1}$ derived from a S═O bond were recognized. A conductive composition D20 was obtained in the same manner as in the case of the conductive composition D19 described above except that the reaction liquid containing the precursor 20 was used instead of the reaction liquid containing the precursor 19.

Example D21: Conductive Composition D21

0.34 g of silver (I) nitrate (manufactured by Kishida Chemical Co., Ltd.) was dissolved in 800 mL of ultrapure water to provide an aqueous solution of silver nitrate. After the aqueous solution was heated to 80° C., 324.0 mg of a water-soluble conductive polymer (product name: "aqua-PASS-01X", weight-average molecular weight: 15,000, manufactured by Mitsubishi Chemical Corporation) ("compound/metal particle"=0.075 times) was added thereto. Then, the resultant was increased in temperature to 100° C. and subjected to a reaction under stirring for another 30 hours to provide a reaction liquid containing a precursor 21. As a result of the measurement of the infrared absorption spectrum of the resultant precursor 21, an absorption peak at about 545 $cm^{-1}$ derived from a M-N (silver atom (Ag)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,200 $cm^{-1}$ derived from a S═O bond were recognized. A conductive composition D21 was obtained in the same manner as in the case of the conductive composition D19 described above except that the reaction liquid containing the precursor 21 was used instead of the reaction liquid containing the precursor 19.

Example D22: Conductive Composition D22

0.34 g of silver (I) nitrate (manufactured by Kishida Chemical Co., Ltd.) was dissolved in 800 mL of ultrapure water to provide an aqueous solution of silver nitrate. After the aqueous solution was heated to 80° C., 341.2 mg of a water-soluble conductive polymer (product name: "aqua-PASS-01X", weight-average molecular weight: 15,000, manufactured by Mitsubishi Chemical Corporation) ("compound/metal particle"=0.079 times) was added thereto. Then, the resultant was increased in temperature to 100° C. and subjected to a reaction under stirring for another 30 hours to provide a reaction liquid containing a precursor 22. As a result of the measurement of the infrared absorption spectrum of the resultant precursor 22, an absorption peak at about 545 $cm^{-1}$ derived from a M-N (silver atom (Ag)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1, 198 $cm^{-1}$ derived from a S═O bond were recognized. A conductive composition D22 was obtained in the same manner as in the case of the conductive composition D19 described above except that the reaction liquid containing the precursor 22 was used instead of the reaction liquid containing the precursor 19.

Example D23: Conductive Composition D23

0.034 g of silver (I) nitrate (manufactured by Kishida Chemical Co., Ltd.) was dissolved in 800 mL of ultrapure water to provide an aqueous solution of silver nitrate. After the aqueous solution was heated to 80° C., 1 mg of a water-soluble conductive polymer (product name: "aqua-PASS-01X", weight-average molecular weight: 15,000, manufactured by Mitsubishi Chemical Corporation) ("compound/metal particle"=0.046 times) was added thereto. Then, the resultant was increased in temperature to 100° C. and subjected to a reaction under stirring for another 30 hours to provide a reaction liquid containing a precursor 23. As a result of the measurement of the infrared absorption spectrum of the resultant precursor 23, an absorption peak at about 550 $cm^{-1}$ derived from a M-N (silver atom (Ag)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,197 $cm^{-1}$ derived from a S═O bond were recognized. A conductive composition D23 was obtained in the same manner as in the case of the conductive composition D19 described above except that the reaction liquid containing the precursor 23 was used instead of the reaction liquid containing the precursor 19.

Example D24: Conductive Composition D24

0.068 g of silver (I) nitrate (manufactured by Kishida Chemical Co., Ltd.) was dissolved in 800 mL of ultrapure water to provide an aqueous solution of silver nitrate. After the aqueous solution was heated to 80° C., 2 mg of a water-soluble conductive polymer (product name: "aqua-PASS-01X", weight-average molecular weight: 15,000, manufactured by Mitsubishi Chemical Corporation) ("compound/metal particle"=0.046 times) was added thereto. Then, the resultant was increased in temperature to 100° C. and subjected to a reaction under stirring for another 30 hours to provide a reaction liquid containing a precursor 24. As a result of the measurement of the infrared absorption spectrum of the resultant precursor 24, an absorption peak at about 550 $cm^{-1}$ derived from a M-N (silver atom (Ag)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,200 $cm^{-1}$ derived from a S═O bond were recognized. A conductive composition D24 was obtained in the same manner as in the case of the conductive composition D19 described above except that the reaction liquid containing the precursor 24 was used instead of the reaction liquid containing the precursor 19.

Example D25: Conductive Composition D25

0.408 g of silver (I) nitrate (manufactured by Kishida Chemical Co., Ltd.) was dissolved in 800 mL of ultrapure water to provide an aqueous solution of silver nitrate. After the aqueous solution was heated to 80° C., 12 mg of a water-soluble conductive polymer (product name: "aqua-PASS-01X", weight-average molecular weight: 15,000, manufactured by Mitsubishi Chemical Corporation) ("compound/metal particle"=0.046 times) was added thereto. Then, the resultant was increased in temperature to 100° C. and subjected to a reaction under stirring for another 30 hours to provide a reaction liquid containing a precursor 25. As a result of the measurement of the infrared absorption spectrum of the resultant precursor 25, an absorption peak at about 550 $cm^{-1}$ derived from a M-N (silver atom (Ag)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,205 $cm^{-1}$ derived from a S═O bond were recognized. A conductive composition D25 was obtained in the same manner as in the case of the conductive composition D19 described above except that the reaction liquid containing the precursor 25 was used instead of the reaction liquid containing the precursor 19.

Example D26: Conductive Composition D26

0.510 g of silver (I) nitrate (manufactured by Kishida Chemical Co., Ltd.) was dissolved in 800 mL of ultrapure water to provide an aqueous solution of silver nitrate. After the aqueous solution was heated to 80° C., 15 mg of a water-soluble conductive polymer (product name: "aqua-PASS-01X", weight-average molecular weight: 15,000, manufactured by Mitsubishi Chemical Corporation) ("compound/metal particle"=0.046 times) was added thereto. Then, the resultant was increased in temperature to 100° C. and subjected to a reaction under stirring for another 30 hours to provide a reaction liquid containing a precursor 26. As a result of the measurement of the infrared absorption spectrum of the resultant precursor 26, an absorption peak at about 550 $cm^{-1}$ derived from a M-N (silver atom (Ag)—N) bond and an absorption peak at about 1,550 $cm^{-1}$ derived from a C═C bond were recognized. Further, an absorption peak at about 1,500 $cm^{-1}$ derived from a C═N bond and an absorption peak at about 1,205 $cm^{-1}$ derived from a S═O bond were recognized. A conductive composition D26 was obtained in the same manner as in the case of the conductive composition D19 described above except that the reaction liquid containing the precursor 26 was used instead of the reaction liquid containing the precursor 19.

Comparative Example D1: Conductive Composition D27

1 g of chloroauric (III) acid tetrahydrate was dissolved in 40 mL of ultrapure water to provide an aqueous solution of chloroauric acid. The aqueous solution was kept at room temperature (25° C.), and 20 mg of the compound CA1 ("compound/metal particle"=0.042 times) was added thereto. The resultant was subjected to a reaction under stirring at 25° C. for 15 hours to provide a reaction liquid containing a precursor 27. As a result of the measurement of the infrared absorption spectrum of the resultant precursor 27, an absorption peak at from about 450 $cm^{-1}$ to about 600 $cm^{-1}$ derived from a M-N (gold atom (Au)—N) bond was not recognized, and hence it was found that an intended precursor was not able to be synthesized. The infrared absorption spectrum of the precursor 27 is shown in FIG. 1. From the results, it was recognized that, when the reaction temperature was 25° C. (room temperature), a chemical bond between a metal atom and a nitrogen atom did not occur. A conductive composition D27 was obtained in the same manner as in the case of the conductive composition D1 described above except that the reaction liquid containing the precursor 27 was used instead of the reaction liquid containing the precursor 1.

Comparative Example D2: Conductive Composition D28

A conductive composition was produced through use of polyaniline sulfonic acid (manufactured by Sigma-Aldrich Co. LLC, catalog number: 52328-3, purity: 5%) with reference to the description in Japanese Patent Application Laid-Open No. 2008-081550. 1 g of chloroauric (III) acid tetrahydrate was dissolved in 40 mL of ultrapure water to provide an aqueous solution of chloroauric acid. The aqueous solution was kept at room temperature (25° C.), and polyaniline sulfonic acid (manufactured by Sigma-Aldrich Co. LLC, catalog number: 52328-3, purity: 5%) in an amount for achieving a ratio "compound/metal particle" of 0.042 times was added thereto. The resultant was subjected to a reaction under stirring at 25° C. for 15 hours to provide a reaction liquid containing a precursor 28. As a result of the measurement of the infrared absorption spectrum of the resultant precursor 28, an absorption peak at from about 450 $cm^{-1}$ to about 600 $cm^{-1}$ derived from a M-N (gold atom (Au)—N) bond was not recognized, and hence it was found that an intended precursor was not able to be synthesized. From the results, it was recognized that, when the reaction temperature was 25° C. (room temperature), a chemical bond between a metal atom and a nitrogen atom did not occur. A conductive composition D28 was obtained in the same manner as in the case of the conductive composition D1 described above except that the reaction liquid containing the precursor 28 was used instead of the reaction liquid containing the precursor 1.

Comparative Example D3: Conductive Composition D29

A conductive composition was produced through use of polypyrrole (manufactured by Sigma-Aldrich Co. LLC) with reference to the description in Japanese Patent Application Laid-Open No. 2005-327910. 1 g of chloroauric (III) acid tetrahydrate was dissolved in 40 mL of ultrapure water to provide an aqueous solution of chloroauric acid. After the aqueous solution was heated to 50° C., 20 mg of polypyrrole (manufactured by Sigma-Aldrich Co. LLC) ("compound/metal particle"=0.042 times) was added thereto, and the resultant was subjected to a reaction under stirring at 50° C. for 15 hours to provide a reaction liquid containing a precursor 29. The resultant reaction liquid was black, and an aggregate was generated. As a result of the measurement of the infrared absorption spectrum of the resultant precursor 29, an absorption peak at from about 450 $cm^{-1}$ to about 600 $cm^{-1}$ derived from a M-N (gold atom (Au)—N) bond was not recognized, and hence it was found that an intended precursor was not able to be synthesized. From the results, it was recognized that, when polypyrrole was used, a chemical bond between a metal atom and a nitrogen atom did not occur. A conductive composition D29 was obtained in the same manner as in the case of the conductive composition D1 described above except that the reaction liquid containing the precursor 29 was used instead of the reaction liquid containing the precursor 1. The zeta potential of a metal particle in the conductive composition D29 was not able to be measured. In addition, when the maximum absorption wavelength of the conductive composition D29 was measured, the maximum absorption wavelength was not clear, though broad absorption was recognized at 720 nm.

Comparative Example D4: Conductive Composition D30

A conductive composition was produced through use of polyaniline (manufactured by Sigma-Aldrich Co. LLC) with reference to the description in Japanese Patent Application Laid-Open No. 2005-327910. 1 g of chloroauric (III) acid tetrahydrate was dissolved in 40 mL of ultrapure water to provide an aqueous solution of chloroauric acid. After the aqueous solution was heated to 50° C., 20 mg of polyaniline (manufactured by Sigma-Aldrich Co. LLC) ("compound/metal particle"=0.042 times) was added thereto, and the resultant was subjected to a reaction under stirring at 50° C. for 15 hours to provide a reaction liquid containing a precursor 30. Brown suspended matter was generated in the resultant reaction liquid. As a result of the measurement of the infrared absorption spectrum of the resultant precursor 30, an absorption peak at from about 450 $cm^{-1}$ to about 600 $cm^{-1}$ derived from a M-N (gold atom (Au)—N) bond was not recognized, and hence it was found that an intended precursor was not able to be synthesized. From the results, it was recognized that, when polyaniline free of any sulfonic acid group was used, a chemical bond between a metal atom and a nitrogen atom did not occur. A conductive composition D30 was obtained in the same manner as in the case of the conductive composition D1 described above except that the reaction liquid containing the precursor 30 was used instead of the reaction liquid containing the precursor 1.

Comparative Example D5: Conductive Composition D31

A conductive composition was produced through use of polythiophene (poly(3,4-ethylenedioxythiophene), manufactured by Sigma-Aldrich Co. LLC) with reference to the description in Japanese Patent Application Laid-Open No. 2005-327910. 1 g of chloroauric (III) acid tetrahydrate was dissolved in 40 mL of ultrapure water to provide an aqueous solution of chloroauric acid. After the aqueous solution was heated to 50° C., 20 mg of polythiophene (poly(3,4-ethylenedioxythiophene), manufactured by Sigma-Aldrich Co. LLC) ("compound/metal particle"=0.042 times) was added thereto, and the resultant was subjected to a reaction under stirring at 50° C. for 15 hours to provide a reaction liquid containing a precursor 31. The resultant reaction liquid was black, and an aggregate was generated. As a result of the measurement of the infrared absorption spectrum of the resultant precursor 31, an absorption peak at from about 450 $cm^{-1}$ to about 600 $cm^{-1}$ derived from a M-N (gold atom (Au)—N) bond was not recognized, and hence it was found that an intended precursor was not able to be synthesized. From the results, it was recognized that, when polythiophene was used, a chemical bond between a metal atom and a nitrogen atom did not occur. A conductive composition D31 was obtained in the same manner as in the case of the conductive composition D1 described above except that the reaction liquid containing the precursor 31 was used instead of the reaction liquid containing the precursor 1. The zeta potential of a metal particle in the conductive composition D31 was not able to be measured. In addition, when the maximum absorption wavelength of the conductive composition D31 was measured, the maximum absorption wavelength was not clear, though broad absorption was recognized at 750 nm.

Comparative Example D6: Conductive Composition D32

0.34 g of silver (I) nitrate (manufactured by Kishida Chemical Co., Ltd.) was dissolved in 800 mL of ultrapure water to provide an aqueous solution of silver nitrate. The aqueous solution was kept at 25° C. (room temperature), and 10 mg of the compound CA1 ("compound/metal particle"=0.046 times) was added thereto. The resultant was subjected to a reaction under stirring at 25° C. for 30 hours to provide a reaction liquid containing a precursor 32. As a result of the measurement of the infrared absorption spectrum of the resultant precursor 32, an absorption peak at about 575 $cm^{-1}$ derived from a M-N (silver atom (Ag)—N) bond was not recognized, and hence it was found that an intended precursor was not able to be synthesized. From the results, it was recognized that, when the reaction temperature was 25° C. (room temperature), a chemical bond between a metal atom and a nitrogen atom did not occur.

To the entire amount of the reaction liquid containing the precursor 32, 0.88 g of trisodium citrate dihydrate was added at 25° C., followed by stirring for 1 hour. The aqueous solution was purified with an ultrafiltration apparatus (product name: "TFF Minimate Ultrafiltration System", filter: 30K, manufactured by Pall Corporation) until the electric conductivity of a filtrate reached 2 mS/m. Thus, a conductive composition D32 was obtained.

Comparative Example D7: Conductive Composition D33

A conductive composition was produced through use of polyaniline sulfonic acid (manufactured by Sigma-Aldrich Co. LLC, catalog number: 52328-3, purity: 5%) with reference to the description in Japanese Patent Application Laid-Open No. 2008-081550. 0.34 g of silver (I) nitrate (manufactured by Kishida Chemical Co., Ltd.) was dissolved in 800 mL of ultrapure water to provide an aqueous solution of silver nitrate. The aqueous solution was kept at 25° C. (room temperature), and 10 mg of the compound CA1 ("compound/metal particle"=0.046 times) was added thereto. The resultant was subjected to a reaction under stirring at 25° C. for 30 hours to provide a reaction liquid containing a precursor 33. As a result of the measurement of the infrared absorption spectrum of the resultant precursor 33, an absorption peak at about 575 $cm^{-1}$ derived from a M-N (silver atom (Ag)—N) bond was not recognized, and hence it was found that an intended precursor was not able to be synthesized. From the results, it was recognized that, when the reaction temperature was 25° C. (room temperature), a chemical bond between a metal atom and a nitrogen atom did not occur. A conductive composition D33 was obtained in the same manner as in the case of the conductive composition D32 described above except that the reaction liquid containing the precursor 33 was used instead of the reaction liquid containing the precursor 32.

Comparative Example D8: Conductive Composition D34

A conductive composition was produced through use of polypyrrole (manufactured by Sigma-Aldrich Co. LLC) with reference to the description in Japanese Patent Application Laid-Open No. 2005-327910. 0.34 g of silver (I) nitrate (manufactured by Kishida Chemical Co., Ltd.) was dissolved in 800 mL of ultrapure water to provide an aqueous solution of silver nitrate. After the aqueous solution was heated to 80° C., 10 mg of polypyrrole (manufactured by Sigma-Aldrich Co. LLC) ("compound/metal particle"=0.046 times) was added thereto. Then, the resultant was increased in temperature to 100° C. and subjected to a reaction under stirring for another 30 hours to provide a reaction liquid containing a precursor 34. The resultant reaction liquid was white, and an aggregate was generated. As a result of the measurement of the infrared absorption spectrum of the resultant precursor 34, an absorption peak at about 575 $cm^{-1}$ derived from a M-N (silver atom (Ag)—N) bond was not recognized, and hence it was found that an intended precursor was not able to be synthesized. From the results, it was recognized that, when polyaniline free of any sulfonic acid group was used, a chemical bond between a metal atom and a nitrogen atom did not occur. A conductive composition D34 was obtained in the same manner as in the case of the conductive composition D17 described above except that the reaction liquid containing the precursor 34 was used instead of the reaction liquid containing the precursor 17. The zeta potential of a metal particle in the conductive composition D34 was not able to be measured. In addition, when the maximum absorption wavelength of the conductive composition D34 was measured, the maximum absorption wavelength was not clear, though broad absorption was recognized at 730 nm.

Comparative Example D9: Conductive Composition D35

A conductive composition was produced through use of polyaniline (manufactured by Sigma-Aldrich Co. LLC) with reference to the description in Japanese Patent Application Laid-Open No. 2005-327910. 0.34 g of silver (I) nitrate (manufactured by Kishida Chemical Co., Ltd.) was dissolved in 800 mL of ultrapure water to provide an aqueous solution of silver nitrate. After the aqueous solution was heated to 80° C., 10 mg of polyaniline (manufactured by Sigma-Aldrich Co. LLC) ("compound/metal particle"=0.046 times) was added thereto. Then, the resultant was increased in temperature to 100° C. and subjected to a reaction under stirring for another 30 hours to provide a reaction liquid containing a precursor 35. Brown suspended matter was generated in the resultant reaction liquid. As a result of the measurement of the infrared absorption spectrum of the resultant precursor 35, an absorption peak at about 575 $cm^{-1}$ derived from a M-N (silver atom (Ag)—N) bond was not recognized, and hence it was found that an intended precursor was not able to be synthesized. From the results, it was recognized that, when polyaniline free of any sulfonic acid group was used, a chemical bond between a metal atom and a nitrogen atom did not occur. A conductive composition D35 was obtained in the same manner as in the case of the conductive composition D17 described above except that the reaction liquid containing the precursor 35 was used instead of the reaction liquid containing the precursor 17.

Comparative Example D10: Conductive Composition D36

A conductive composition was produced through use of polythiophene (poly(3,4-ethylenedioxythiophene), manufactured by Sigma-Aldrich Co. LLC) with reference to the description in Japanese Patent Application Laid-Open No. 2005-327910. 0.34 g of silver (I) nitrate (manufactured by Kishida Chemical Co., Ltd.) was dissolved in 800 mL of ultrapure water to provide an aqueous solution of silver nitrate. After the aqueous solution was heated to 80° C., 10 mg of polythiophene (poly(3,4-ethylenedioxythiophene), manufactured by Sigma-Aldrich Co. LLC) ("compound/metal particle"=0.046 times) was added thereto. Then, the resultant was increased in temperature to 100° C. and subjected to a reaction under stirring for another 30 hours to provide a reaction liquid containing a precursor 36. The resultant reaction liquid was white, and an aggregate was generated. As a result of the measurement of the infrared absorption spectrum of the resultant precursor 36, an absorption peak at about 575 $cm^{-1}$ derived from a M-N (silver atom (Ag)—N) bond was not recognized, and hence it was found that an intended precursor was not able to be synthesized. From the results, it was recognized that, when polyaniline free of any sulfonic acid group was used, a chemical bond between a metal atom and a nitrogen atom did not occur. A conductive composition D36 was obtained in the same manner as in the case of the conductive composition D17 described above except that the reaction liquid containing the precursor 36 was used instead of the reaction liquid containing the precursor 17. The zeta potential of a metal particle in the conductive composition D36 was not able to be measured. In addition, when the maximum absorption wavelength of the conductive composition D36 was measured, the maximum absorption wavelength was not clear, though broad absorption was recognized at 725 nm.

Comparative Example D11: Conductive Composition D37

Figure 4:
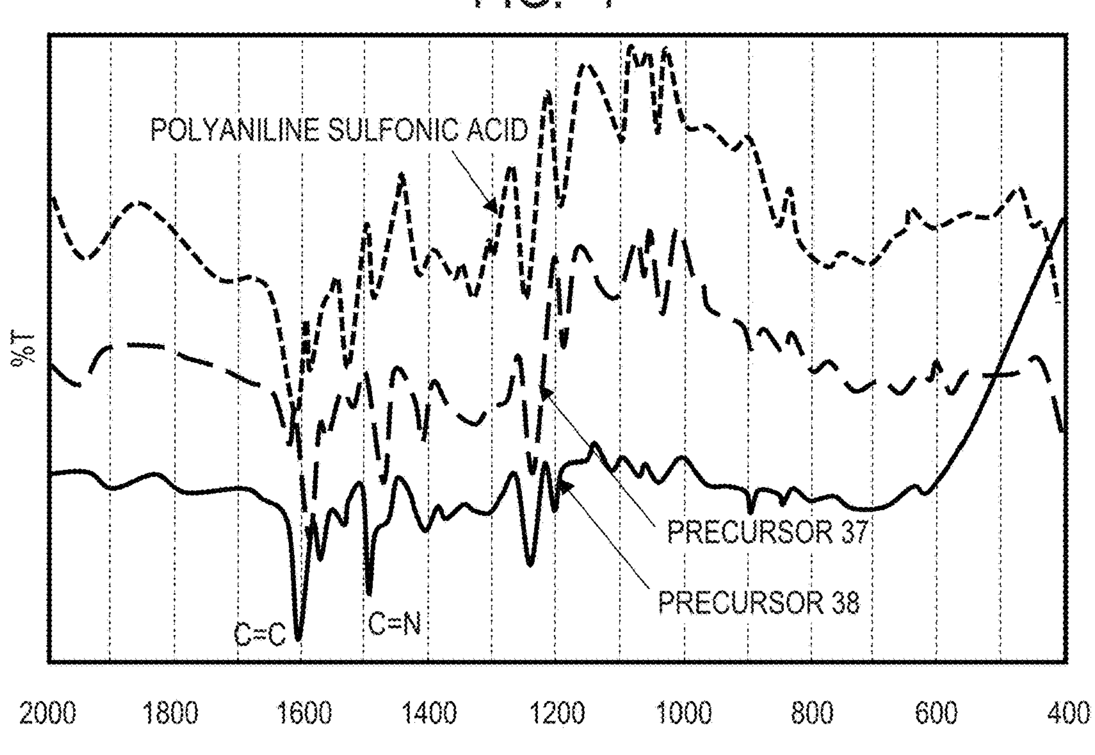
FIG. 4 shows infrared absorption (IR) spectra of polyaniline sulfonic acid, and precursors 37 and 38.

A conductive composition was produced through use of polyaniline sulfonic acid (manufactured by Sigma-Aldrich Co. LLC, catalog number: 52328-3, purity: 5%) with reference to the description in Japanese Patent Application Laid-Open No. 2008-081550. Polyaniline sulfonic acid (manufactured by Sigma-Aldrich Co. LLC, catalog number: 52328-3, purity: 5%) in an amount for achieving a ratio "compound/metal particle" of 0.004 times was dissolved in 800 mL of ultrapure water to provide an aqueous solution. 1 g of silver nitrate was added to the aqueous solution, followed by stirring at 25° C. for 20 minutes. Further, three droplets of a hydrazine aqueous solution (manufactured by Sigma-Aldrich Co. LLC) were added dropwise thereto. Through the dropwise addition of the hydrazine aqueous solution, the color of the aqueous solution became dark and then turned white and cloudy. The resultant was stirred at 25° C. for another 1 hour to provide an aqueous solution containing a precursor 37. As a result of the measurement of the infrared absorption spectrum of the resultant precursor 37, an absorption peak at about 575 $cm^{-1}$ derived from a M-N (silver atom (Ag)—N) bond was not recognized, and hence it was found that an intended precursor was not able to be synthesized. From the results, it was recognized that, when the reaction temperature was 25° C. (room temperature), a chemical bond between a metal atom and a nitrogen atom did not occur. The infrared absorption spectrum of the precursor 37 is shown in FIG. 4 together with the infrared absorption spectrum of the polyaniline sulfonic acid described above. A conductive composition D37 was obtained in the same manner as in the case of the conductive composition D1 described above except that the reaction liquid containing the precursor 37 was used instead of the reaction liquid containing the precursor 1.

Comparative Example D12: Conductive Composition D38

A conductive composition was produced through use of polyaniline sulfonic acid (manufactured by Sigma-Aldrich Co. LLC, catalog number: 52328-3, purity: 5%) with reference to the description in Japanese Patent Application Laid-Open No. 2008-081550. Polyaniline sulfonic acid (manufactured by Sigma-Aldrich Co. LLC, catalog number: 52328-3, purity: 5%) in an amount for achieving a ratio "compound/metal particle" of 0.079 times was dissolved in 800 mL of ultrapure water to provide an aqueous solution. 1 g of silver nitrate was added to the aqueous solution, followed by stirring at 25° C. for 20 minutes. Further, three droplets of a hydrazine aqueous solution (manufactured by Sigma-Aldrich Co. LLC) were added dropwise thereto. The resultant was stirred at 25° C. for another 1 hour to provide an aqueous solution containing a precursor 38. The resultant aqueous solution was gray. As a result of the measurement of the infrared absorption spectrum of the resultant precursor 38, an absorption peak at about 575 $cm^{-1}$ derived from a M-N (silver atom (Ag)—N) bond was not recognized, and hence it was found that an intended precursor was not able to be synthesized. From the results, it was recognized that, when the reaction temperature was 25° C. (room temperature), a chemical bond between a metal atom and a nitrogen atom did not occur. The infrared absorption spectrum of the precursor 38 is shown in FIG. 4 together with the infrared absorption spectrum of the polyaniline sulfonic acid described above. A conductive composition D38 was obtained in the same manner as in the case of the conductive composition D1 described above except that the reaction liquid containing the precursor 38 was used instead of the reaction liquid containing the precursor 1.

The details of the produced conductive compositions are shown in Table 1 (Table 1-1 and Table 1-2).

TABLE 1-1

| Composition of conductive composition (dispersion liquid) | | | | | |
|---|---|---|---|---|---|
| | | Conductive composition (dispersion liquid) | Treatment agent | | Metal particle |
| | | | Kind | Weight-average molecular weight | |
| Example | D1 | D1 | CA1 | 10,000 | Au |
| | D2 | D2 | CA2 | 20,000 | Au |
| | D3 | D3 | PA | 20,000 | Au |
| | D4 | D4 | SA | 20,000 | Au |
| | D5 | D5 | aquaPASS-01X | 15,000 | Au |
| | D6 | D6 | CA1 | 10,000 | Au |
| | D7 | D7 | PA | 20,000 | Au |
| | D8 | D8 | SA | 20,000 | Au |
| | D9 | D9 | aquaPASS-01X | 15,000 | Au |
| | D10 | D10 | CA1 | 10,000 | Au |
| | D11 | D11 | CA1 | 10,000 | Au |
| | D12 | D12 | CA1 | 10,000 | Au |
| | D13 | D13 | PA | 20,000 | Au |
| | D14 | D14 | SA | 20,000 | Au |
| | D15 | D15 | aquaPASS-01X | 15,000 | Au |
| | D16 | D16 | CA1 | 10,000 | Au (recovered) |
| | D17 | D17 | CA1 | 10,000 | Ag |
| | D18 | D18 | aquaPASS-01X | 15,000 | Ag |
| | D19 | D19 | aquaPASS-01X | 15,000 | Ag |
| | D20 | D20 | aquaPASS-01X | 15,000 | Ag |
| | D21 | D21 | aquaPASS-01X | 15,000 | Ag |
| | D22 | D22 | aquaPASS-01X | 15,000 | Ag |
| | D23 | D23 | aquaPASS-01X | 15,000 | Ag |
| | D24 | D24 | aquaPASS-01X | 15,000 | Ag |
| | D25 | D25 | aquaPASS-01X | 15,000 | Ag |
| | D26 | D26 | aquaPASS-01X | 15,000 | Ag |
| Comparative Example | D1 | D27 | CA1 | 10,000 | Au |
| | D2 | D28 | Polyaniline sulfonic acid | 10,000 | Au |
| | D3 | D29 | Polypyrrole | — | Au |
| | D4 | D30 | Polyaniline | — | Au |
| | D5 | D31 | Polythiophene | — | Au |
| | D6 | D32 | CA1 | 10,000 | Ag |
| | D7 | D33 | Polyaniline sulfonic acid | 10,000 | Ag |
| | D8 | D34 | Polypyrrole | — | Ag |
| | D9 | D35 | Polyaniline | — | Ag |
| | D10 | D36 | Polythiophene | — | Ag |
| | D11 | D37 | Polyaniline sulfonic acid | 10,000 | Ag |
| | D12 | D38 | Polyaniline sulfonic acid | 10,000 | Ag |

TABLE 1-2

| Composition and characteristics of conductive composition (dispersion liquid) | | | | | |
|---|---|---|---|---|---|
| | | Mass ratio of "compound/metal particle" (times) | D50 (nm) | Maximum absorption wavelength (nm) | Zeta potential (mV) |
| Example | D1 | 0.042 | 23 | 520 | −45 |
| | D2 | 0.042 | 21 | 520 | −40 |
| | D3 | 0.042 | 20 | 520 | −41 |
| | D4 | 0.042 | 19 | 519 | −38 |
| | D5 | 0.042 | 20 | 520 | −35 |
| | D6 | 0.042 | 20 | 520 | −41 |
| | D7 | 0.042 | 20 | 520 | −40 |
| | D8 | 0.042 | 19 | 519 | −35 |
| | D9 | 0.042 | 20 | 520 | −35 |
| | D10 | 0.042 | 24 | 521 | −45 |
| | D11 | 0.042 | 23 | 520 | −45 |
| | D12 | 0.042 | 19 | 519 | −45 |
| | D13 | 0.042 | 19 | 519 | −44 |
| | D14 | 0.042 | 20 | 519 | −43 |
| | D15 | 0.042 | 20 | 520 | −37 |

TABLE 1-2-continued

| Composition and characteristics of conductive composition (dispersion liquid) | | | | | |
|---|---|---|---|---|---|
| | | Mass ratio of "compound/metal particle" (times) | D50 (nm) | Maximum absorption wavelength (nm) | Zeta potential (mV) |
| | D16 | 0.042 | 19 | 519 | −44 |
| | D17 | 0.046 | 19 | 395 | −43 |
| | D18 | 0.046 | 19 | 396 | −43 |
| | D19 | 0.0025 | 101 | 491 | −31 |
| | D20 | 0.005 | 19 | 395 | −40 |
| | D21 | 0.075 | 20 | 395 | −45 |
| | D22 | 0.079 | 20 | 395 | −44 |
| | D23 | 0.046 | 2 | 393 | −38 |
| | D24 | 0.046 | 5 | 394 | −50 |
| | D25 | 0.046 | 97 | 485 | −40 |
| | D26 | 0.046 | 115 | 510 | −31 |
| Comparative Example | D1 | 0.042 | 102 | 561 | −23 |
| | D2 | 0.042 | 103 | 563 | −21 |
| | D3 | 0.042 | — | 720 (broad) | — |
| | D4 | 0.042 | 120 | 605 | +28 |
| | D5 | 0.042 | — | 750 (broad) | — |
| | D6 | 0.046 | 105 | 505 | −26 |
| | D7 | 0.046 | 109 | 503 | −27 |
| | D8 | 0.046 | — | 730 (broad) | — |
| | D9 | 0.046 | 107 | 528 | +25 |
| | D10 | 0.046 | — | 725 (broad) | — |
| | D11 | 0.004 | 103 | 502 | −29 |
| | D12 | 0.079 | 105 | 503 | −25 |

<Production of Conductive Composition (Ink)>

An aqueous ink (conductive composition) including an aqueous medium and a surfactant was produced by the following method. The average particle diameter of the metal particle in each of the obtained inks fell within the range of +1 nm of the average particle diameter of the metal particle in the conductive composition (dispersion liquid) used as a raw material. From this fact, it was found that the metal particle was stably dispersed in each of the conductive composition and the ink.

The conductive composition (dispersion liquid) obtained above was concentrated with an ultrafiltration apparatus (product name: "TFF Minimate Ultrafiltration System", filter: 30K, manufactured by Pall Corporation) to provide a concentrated liquid of the conductive composition containing a metal particle at a content of 14.85%. Then, each component was mixed so as to achieve the following blending ratio. Thus, each ink containing a metal particle at a content of 10.0% was obtained. An acetylene glycol-based surfactant (product name: "OLFINE PD-005", manufactured by Nissin Chemical Co., Ltd.) was used as a surfactant.

Concentrated liquid of conductive composition: 67.4 parts

Ethylene glycol: 31.0 parts

Surfactant: 0.1 part

Resin of a kind shown in Table 2 (Table 2-1 and Table 2-2): usage amount (parts) for forming a resin (solid content) of 1.25 parts Ultrapure water: usage amount (parts) for forming a total of components of 100.0%

The following commercially available products were used as resins shown in Table 2.

Resin 1: water dispersion liquid of polyester resin, (product name: "Vylonal MD-2000", resin particle content: 40%, manufactured by TOYOBO Co., Ltd.)

Resin 2: water-soluble nylon resin (polyamide resin) (product name: "AQ Nylon A-90", manufactured by Toray Industries, Inc.)

Resin 3: water dispersion liquid of polyvinyl chloride/polyvinyl acetate copolymer resin (product name: "VINYBLAN 603", resin particle content: 50%, manufactured by Nissin Chemical Industry Co., Ltd.)

Resin 4: water dispersion liquid of polyamide resin (product name: "SEPOLSION NE205", resin particle content: 40%, manufactured by Sumitomo Seika Chemicals Co., Ltd.)

Resin 5: water dispersion liquid of polyolefin resin (product name: "SUMIFITT WR101", resin particle content: 31%, manufactured by Sumitomo Chemical Co., Ltd.)

Resin 6: water dispersion liquid of polyolefin/polyvinyl acetate copolymer resin (product name: "SEPOLSION VA406", resin particle content: 50%, manufactured by Sumitomo Seika Chemicals Co., Ltd.)

Resin 7: water dispersion liquid of polyurethane resin (product name: "SUPERFLEX 210", resin particle content: 35%, manufactured by DKS Co. Ltd.)

An aggregate was generated in each of the conductive compositions (inks) prepared through use of the conductive compositions (dispersion liquids) D29 to D31 and D34 to D36, and the subsequent evaluations were not able to be performed.

<Evaluation of Dispersion Stability>

Figure 5:
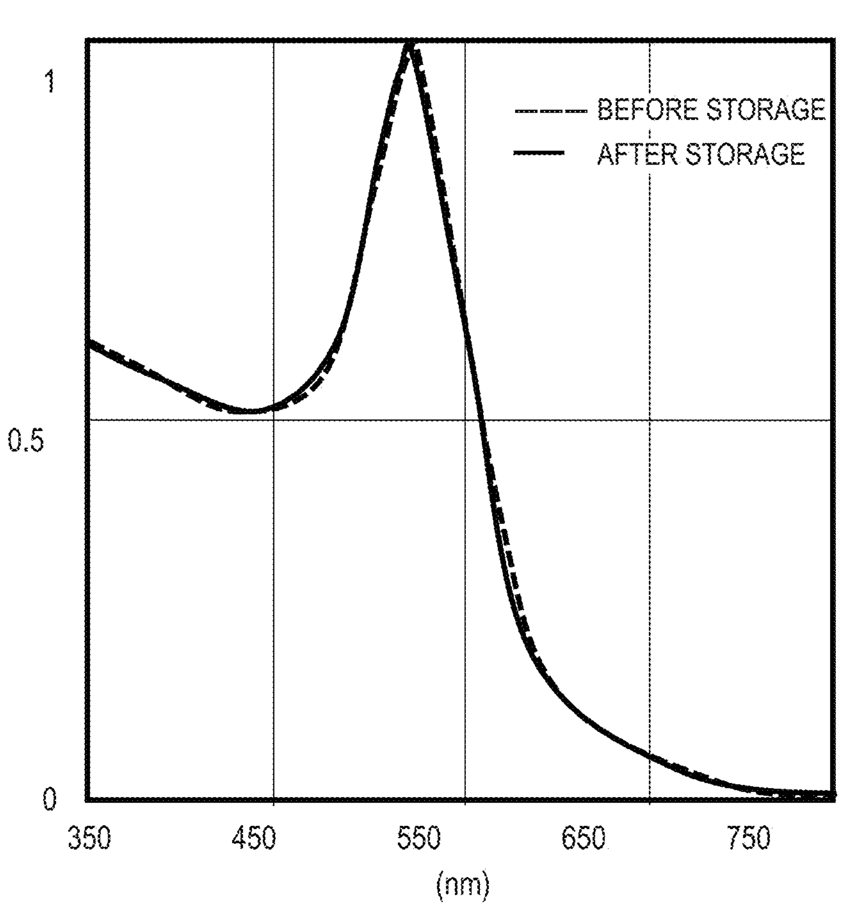
FIG. 5 shows UV-visible spectroscopic (UV-vis) spectra of an ink 1 before and after storage.
Figure 6:
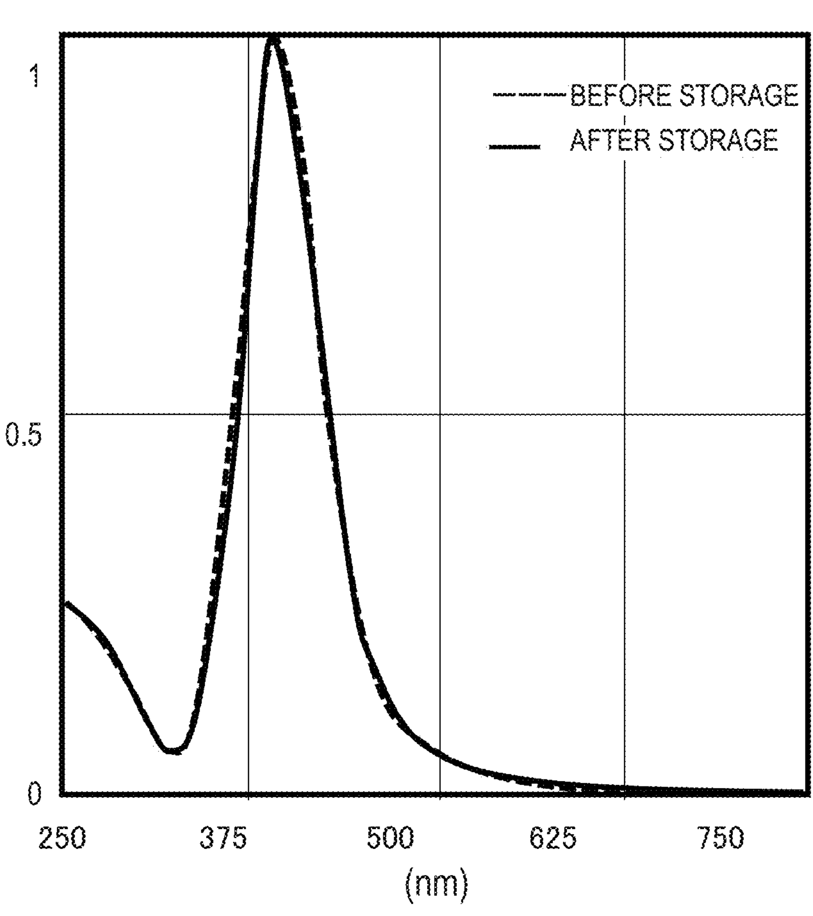
FIG. 6 shows UV-visible spectroscopic (UV-vis) spectra of an ink 25 before and after storage.

1 mL of the resultant ink (conductive composition) was placed in a sealable glass bottle and stored in an incubator (product name: "IC602", manufactured by Yamato Scientific Co., Ltd.) at 60° C. for a predetermined period of time. The ink (conductive composition) after storage was diluted 1,500 times (on a volume basis) with ultrapure water and analyzed with a UV-visible near-infrared spectrophotometer (product name: "UV-3600", manufactured by Shimadzu Corporation). When the absorption of light at a wavelength of 700 nm was increased by 30% as compared to the absorption before storage, it was determined that the ink "aggregated", and dispersion stability was evaluated in accordance with the following evaluation criteria based on the storage period of time up to aggregation. The results are shown in Table 2. In the evaluation criteria described below, "A" and "B" were each defined as an acceptable level, and "C" was defined as an unacceptable level. UV-visible spectroscopic (UV-vis) spectra of the inks 1 and 25 before and after storage for 2 weeks are shown in FIG. 5 and FIG. 6, respectively. It is understood from FIG. 5 and FIG. 6 that there is no significant difference in infrared absorption spectrum before and after storage, and dispersion stability is obtained.

A: The period of time up to aggregation was 2 weeks or more.

B: The period of time up to aggregation was 1 week or more to less than 2 weeks.

C: The period of time up to aggregation was less than 1 week.

TABLE 2-1

| Composition and evaluation results of conductive composition (ink) | | | | |
|---|---|---|---|---|
| | | Conductive composition (dispersion liquid) | Kind of resin | Dispersion stability |
| Example | I1 | D1 | 1 | A |
| | I2 | D1 | 2 | A |
| | I3 | D1 | 3 | A |
| | I4 | D1 | 4 | A |
| | I5 | D1 | 5 | A |
| | I6 | D1 | 6 | A |
| | I7 | D2 | 7 | A |
| | I8 | D3 | 1 | A |
| | I9 | D4 | 1 | A |
| | I10 | D5 | 1 | A |
| | I11 | D6 | 1 | A |
| | I12 | D7 | 1 | A |
| | I13 | D8 | 1 | A |
| | I14 | D9 | 1 | A |
| | I15 | D10 | 1 | A |
| | I16 | D11 | 1 | A |

TABLE 2-1-continued

| Composition and evaluation results of conductive composition (ink) | | | |
|---|---|---|---|
| | Conductive composition (dispersion liquid) | Kind of resin | Dispersion stability |
| I17 | D12 | 1 | A |
| I18 | D12 | 4 | A |
| I19 | D12 | 5 | A |
| I20 | D12 | 6 | A |
| I21 | D13 | 1 | A |
| I22 | D14 | 1 | A |
| I23 | D15 | 1 | A |
| I24 | D16 | 1 | A |
| I25 | D17 | 1 | A |
| I26 | D18 | 1 | A |
| I27 | D19 | 1 | B |
| I28 | D20 | 1 | A |
| I29 | D21 | 1 | A |
| I30 | D22 | 1 | A |
| I31 | D23 | 1 | B |
| I32 | D24 | 1 | A |
| I33 | D25 | 1 | A |
| I34 | D26 | 1 | B |
| I35 | D1 | — | A |
| I36 | D17 | — | A |

TABLE 2-2

| Composition and evaluation results of conductive composition (ink) | | | | |
|---|---|---|---|---|
| | | Conductive composition (dispersion liquid) | Kind of resin | Dispersion stability |
| Comparative Example | I1 | D27 | 1 | C |
| | I2 | D28 | 1 | C |
| | I3 | D29 | An aggregate was generated. | |
| | I4 | D30 | An aggregate was generated. | |
| | I5 | D31 | An aggregate was generated. | |
| | I6 | D32 | 1 | C |
| | I7 | D33 | 1 | C |
| | I8 | D34 | An aggregate was generated. | |
| | I9 | D35 | An aggregate was generated. | |
| | I10 | D36 | An aggregate was generated. | |
| | I11 | D37 | — | C |
| | I12 | D38 | — | C |

<Production of Conductive Image>

The ink (conductive composition) was loaded into an ink cartridge and set in an ink jet recording apparatus (product name: "LaboJet-500", manufactured by MICROJET Corporation) that ejected an ink from an ejection head by the action of physical energy with a piezoelectric element. Through use of this ink jet recording apparatus, a solid image was recorded on the following sheet-shaped base material under an environment at a temperature of 25° C. and a relative humidity of 50% while the amount of an ink (conductive composition) applied to a unit region measuring 1/600 inch by 1/600 inch was set to 20 ng. Thus, a recorded product was obtained. The resultant recorded product was dried for a period of time shown in Table 3 (Table 3-1 and Table 3-2) under an environment at a drying temperature shown in Table 3 and a relative humidity of 50%, to thereby provide each conductive image (rectangular image measuring 2 mm by 3 cm).

PET: PET film, product name: "PANACREA ACX", manufactured by Panac Co., Ltd.

PI: polyimide film, product name: "Kapton H", manufactured by Du Pont-Toray Co., Ltd.

PP: polypropylene film, product name: "TORAYFAN #40-2500", manufactured by Toray Industries, Inc.

PC: polycarbonate film, product name: "PURE-ACE D", manufactured by Teijin Limited Gelatin sheet: a product obtained by applying a 0.1% gelatin solution manufactured by FUJIFILM Wako Pure Chemical Corporation to the PET film with a bar coater and drying the solution Fibroin sheet: a product obtained by applying a 5% fibroin aqueous solution manufactured by Millipore Sigma to the PET film with a bar coater and drying the solution <Evaluation of Conductivity>

The thickness of the obtained conductive image was measured with a stylus thickness meter (manufactured by Tencor). The sectional area of the conductive image was calculated from the measured thickness and the volume resistivity thereof was measured and calculated by a four-point probe method. In addition, the conductivity of the conductive image was evaluated in accordance with the following evaluation criteria. In the following evaluation criteria, "A" was defined as an acceptable level and "C" was defined as an unacceptable level. The results are shown in Table 3.

A: The volume resistivity was less than $1\times10^{-3}$ Ω·cm.

C: The volume resistivity was $1\times10^{-3}$ Ω·cm or more, or no conductivity was shown.

<Evaluation of Adhesiveness>

A conductive image (3.5 cm (width)×3.5 cm (length)×1 μm (thickness)) was obtained under the same conditions as those used for the above-mentioned evaluation of conductivity. In the conductive image, vertical and horizontal cuts were formed with a box cutter along a cross-cut plate (product name: "Cross-cut Plate," cut width; 2 mm, manufactured by Allgood) to produce a lattice-shaped cross-cut. A pressure-sensitive adhesive tape (Cellotape (trademark) CT-24, manufactured by NICHIBAN Co., Ltd., pressure-sensitive adhesive strength: 4.01 N/10 mm) was attached to the cross-cut portion and then instantly peeled off at an angle of 60°. The peeling state in a coating film (conductive image) was visually observed and classified into the following classifications 0 to 5 with reference to JIS-K5600, "Adhesion cross-cut method", and the adhesiveness of the conductive image was evaluated in accordance with the following evaluation criteria. In the evaluation criteria described below, "A" and "B" are each defined as an acceptable level, and "A" indicates more satisfactory adhesiveness. The results are shown in Table 3.

(Classification)

Classification 0: The edge of each cut was smooth, and there was no peeling at any of lattice joints.

Classification 1: There was small peeling of the coating film at the intersections of the cuts, but less than 5% of the cross-cut portions were affected.

Classification 2: The coating film was peeled along the lines of the cuts and/or at the intersections. More than 5% to 15% or less of the cross-cut portions were affected.

Classification 3: The coating film was largely peeled partially or totally along the lines of the cuts and/or a joint portion was partially or totally peeled. More than 15% to 35% or less of the cross-cut portions were affected.

Classification 4: The coating film was largely peeled partially or totally along the lines of the cuts and/or several joint portions were partially or totally peeled. More than 35% to 65% or less of the cross-cut portions were affected.

Classification 5: The degree of peeling was any one of those unable to be classified even in Classification 4.

(Evaluation Criteria)

A: The results corresponded to Classification 0, Classification 1 or Classification 2.

B: The results corresponded to Classification 3, Classification 4 or Classification 5.

TABLE 3-1

Production conditions and evaluation results of conductive image

| | | Production conditions | | | | Conductivity | | Adhesiveness | |
|---|---|---|---|---|---|---|---|---|---|
| | | Conductive composition (ink) | Base material | Drying temperature (° C.) | Drying time (h) | Volume resistivity ($\times 10^{-5}$ Ω · cm) | Evaluation result | JIS K 5600 classification | Evaluation result |
| Example | E1 | I1 | PET | 25 | 25 | 5 | A | 0 | A |
| | E2 | I2 | PET | 25 | 24 | 3 | A | 0 | A |
| | E3 | I3 | PET | 25 | 24 | 5 | A | 0 | A |
| | E4 | I4 | PI | 25 | 24 | 4 | A | 1 | A |
| | E5 | I5 | PP | 25 | 24 | 3 | A | 2 | A |
| | E6 | I6 | PC | 25 | 24 | 5 | A | 1 | A |
| | E7 | I7 | PET | 25 | 24 | 2 | A | 0 | A |
| | E8 | I8 | PET | 25 | 24 | 5 | A | 0 | A |
| | E9 | I9 | PET | 25 | 24 | 7 | A | 0 | A |
| | E10 | I10 | PET | 25 | 24 | 7 | A | 0 | A |
| | E11 | I11 | PET | 25 | 24 | 3 | A | 0 | A |
| | E12 | I12 | PET | 25 | 24 | 5 | A | 0 | A |
| | E13 | I13 | PET | 25 | 24 | 6 | A | 0 | A |
| | E14 | I14 | PET | 25 | 24 | 7 | A | 0 | A |
| | E15 | I15 | PET | 25 | 24 | 9 | A | 0 | A |
| | E16 | I16 | PET | 25 | 24 | 7 | A | 0 | A |
| | E17 | I17 | PET | 25 | 24 | 3 | A | 0 | A |
| | E18 | I18 | PI | 25 | 24 | 3 | A | 1 | A |
| | E19 | I19 | PP | 25 | 24 | 4 | A | 2 | A |
| | E20 | I20 | PC | 25 | 24 | 5 | A | 1 | A |
| | E21 | I21 | PET | 25 | 24 | 5 | A | 0 | A |
| | E22 | I22 | PET | 25 | 24 | 7 | A | 0 | A |
| | E23 | I23 | PET | 25 | 24 | 6 | A | 0 | A |
| | E24 | I24 | PET | 25 | 24 | 4 | A | 0 | A |
| | E25 | I25 | PET | 25 | 24 | 2 | A | 0 | A |
| | E26 | I26 | PET | 25 | 24 | 5 | A | 0 | A |
| | E27 | I27 | PET | 25 | 24 | 10 | A | 0 | A |

TABLE 3-2

Production conditions and evaluation results of conductive image

| | | Production conditions | | | | Conductivity | | Adhesiveness | |
|---|---|---|---|---|---|---|---|---|---|
| | | Conductive composition (ink) | Base material | Drying temperature (° C.) | Drying time (h) | Volume resistivity ($\times 10^{-5}$ Ω · cm) | Evaluation result | JIS K 5600 classification | Evaluation result |
| Example | E28 | I28 | PET | 25 | 24 | 8 | A | 0 | A |
| | E29 | I29 | PET | 25 | 24 | 8 | A | 0 | A |
| | E30 | I30 | PET | 25 | 24 | 8 | A | 0 | A |
| | E31 | I31 | PET | 25 | 24 | 10 | A | 0 | A |
| | E32 | I32 | PET | 25 | 24 | 0.9 | A | 0 | A |
| | E33 | I33 | PET | 25 | 24 | 8 | A | 0 | A |
| | E34 | I34 | PET | 25 | 24 | 10 | A | 0 | A |
| | E35 | I35 | PET | 25 | 24 | 4 | A | 5 | B |
| | E36 | I36 | PET | 25 | 24 | 1 | A | 5 | B |
| | E37 | I1 | Gelatin sheet | 25 | 24 | 5 | A | 0 | A |
| | E38 | I1 | Fibroin sheet | 25 | 24 | 2 | A | 0 | A |
| | E39 | I1 | Fibroin sheet | 25 | 24 | 2 | A | 0 | A |
| | E40 | I1 | PET | 15 | 24 | 10 | A | 0 | A |
| | E41 | I1 | PET | 15 | 72 | 3 | A | 0 | A |
| | E42 | I1 | PET | 20 | 24 | 6 | A | 0 | A |
| | E43 | I1 | PET | 50 | 24 | 4 | A | 0 | A |
| | E44 | I1 | PET | 120 | 24 | 4 | A | 0 | A |
| Comparative Example | E1 | I1 | PET | 25 | 24 | 250 | C | 4 | B |
| | E2 | I2 | PET | 25 | 24 | 280 | C | 3 | B |
| | E3 | I3 | A conductive image was not able to be recorded. | | | — | — | — | — |
| | E4 | I4 | | | | — | — | — | — |
| | E5 | I5 | | | | — | — | — | — |
| | E6 | I6 | PET | 25 | 24 | 120 | C | 3 | B |
| | E7 | I7 | PET | 25 | 24 | 180 | C | 4 | B |
| | E8 | I8 | A conductive image was not able to | | | — | — | — | — |

TABLE 3-2-continued

| Production conditions and evaluation results of conductive image | | | | | | | | |
|---|---|---|---|---|---|---|---|---|
| | Production conditions | | | | Conductivity | | Adhesiveness | |
| | Conductive composition (ink) | Base material | Drying temperature (° C.) | Drying time (h) | Volume resistivity ($\times 10^{-5}$ Ω · cm) | Evaluation result | JIS K 5600 classification | Evaluation result |
| E9 | I9 | | be recorded. | | — | — | — | — |
| E10 | I10 | | | | — | — | — | — |
| E11 | I11 | PET | 25 | 24 | 950 | C | 5 | B |
| E12 | I12 | PET | 25 | 24 | 2,450 | C | 5 | B |

In the conductive image of Example E44 in which the drying temperature was set to 120° C., the base material was deformed and warped with heat.

According to the present disclosure, the conductive composition, which is excellent in dispersion stability of the metal particle, and with which a conductive image excellent in conductivity can be easily recorded by only performing simple posttreatment, can be provided. In addition, according to the present disclosure, the method of producing the conductive composition, the recording method for a conductive image using the conductive composition and the conductive image can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The present disclosure is not limited to the embodiments described above, and various changes and modifications may be made without departing from the spirit and scope of the present disclosure. The following claims are thus appended hereto in order to make the scope of the present disclosure public.

What is claimed is:

1. A conductive composition comprising:

a metal particle; and a compound having a repeating structure represented by the following general formula (1) and having a weight-average molecular weight of from 1,000 to 100,000, wherein at least a part of a surface of the metal particle is coated with the compound, and a metal atom in the metal particle and a nitrogen atom in the compound are chemically bonded to each other:

(1)

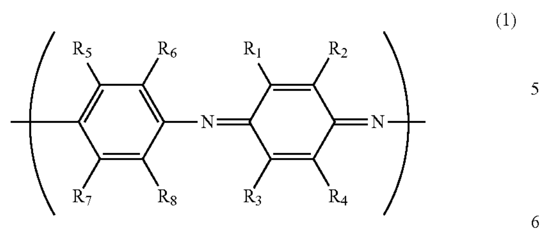

in the general formula (1), $R_1$ to $R_4$ each independently represent a hydrogen atom, an alkyl group, an alkoxy group or a hydrophilic group and at least one of $R_1$ to $R_4$ represents the hydrophilic group, $R_5$ to $R_8$ each independently represent a hydrogen atom, an alkyl group, an alkoxy group or the hydrophilic group and at least one of $R_5$ to $R_8$ represents the hydrophilic group, and the hydrophilic group is at least one kind selected from the group consisting of: a carboxylic acid group; a sulfonic acid group; a phosphoric acid group; and a phosphonic acid group.

2. The conductive composition according to claim 1, wherein in the general formula (1), any one of $R_1$ to $R_4$ represents a carboxylic acid group or a sulfonic acid group, and all the others represent hydrogen atoms.

3. The conductive composition according to claim 1, wherein in the general formula (1), $R_2$ represents a carboxylic acid group or a sulfonic acid group, and $R_1$, $R_3$ and $R_4$ each represent a hydrogen atom.

4. The conductive composition according to claim 1, wherein a content (% by mass) of the compound is 0.001 times or more to 0.100 times or less in terms of mass ratio with respect to a content (% by mass) of the metal particle.

5. The conductive composition according to claim 1, wherein a content (% by mass) of the compound is 0.005 times or more to 0.075 times or less in terms of mass ratio with respect to a content (% by mass) of the metal particle.

6. The conductive composition according to claim 1, wherein the metal particle is formed of at least one kind of metal selected from the group consisting of: nickel; palladium; platinum; copper; silver; and gold.

7. The conductive composition according to claim 1, wherein a volume-based 50% cumulative particle diameter of the metal particle is 1 nm or more to 100 nm or less.

8. The conductive composition according to claim 1, wherein a volume-based 50% cumulative particle diameter of the metal particle is 5 nm or more to 50 nm or less.

9. The conductive composition according to claim 1, further comprising an aqueous medium.

10. The conductive composition according to claim 9, further comprising a resin.

11. The conductive composition according to claim 10, wherein the resin comprises at least one kind of resin selected from the group consisting of: polyester; polyurethane; polyolefin; polystyrene; acrylic; polyvinyl chloride; polyvinyl acetate; polyvinylpyrrolidone; polyamide; polyimide; epoxy; polyvinyl alcohol; and a polysaccharide.

12. The conductive composition according to claim 10, wherein the resin comprises at least one kind of resin selected from the group consisting of: polyester; polyurethane; polyolefin; polyvinyl acetate; and polyamide.

13. A method of producing the conductive composition of claim 1 comprising:

a first step of heating a metal salt and the compound to 40° C. or more to 150° C. or less in an aqueous medium to form a precursor in which a metal atom in the metal salt and a nitrogen atom in the compound are chemically bonded to each other; and a second step of reducing the precursor.

14. The method of producing the conductive composition according to claim 13, wherein the metal salt to be used is a recovered metal salt recovered from a metal waste liquid.

15. A method of recording a conductive image comprising a step of applying the conductive composition of claim 1 to a base material.

16. The method of recording a conductive image according to claim 15, wherein the step of applying the conductive composition to the base material is performed by an ink jet method.

17. The method of recording a conductive image according to claim 15, further comprising a step of drying the conductive composition applied to the base material at a temperature of 20° C. or more to 50° C. or less.

18. A conductive image to be recorded on a base material, wherein the conductive image is formed of the conductive composition of claim 1.

19. A conductive image comprising:

a base material; and a conductive layer formed on the base material, wherein the conductive layer comprises a metal particle and a compound having a repeating structure represented by the following general formula (1) and having a weight-average molecular weight of from 1,000 to 100,000, wherein at least a part of a surface of the metal particle is coated with the compound, and a metal atom in the metal particle and a nitrogen atom in the compound are chemically bonded to each other:

(1)

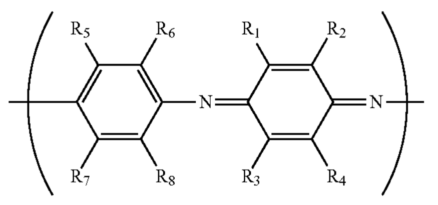

in the general formula (1), $R_1$ to $R_4$ each independently represent a hydrogen atom, an alkyl group, an alkoxy group or a hydrophilic group and at least one of $R_1$ to $R_4$ represents the hydrophilic group, $R_5$ to $R_8$ each independently represent a hydrogen atom, an alkyl group, an alkoxy group or the hydrophilic group and at least one of $R_5$ to $R_8$ represents the hydrophilic group, and the hydrophilic group is at least one kind selected from the group consisting of: a carboxylic acid group; a sulfonic acid group; a phosphoric acid group; and a phosphonic acid group.

20. The conductive image according to claim 19, wherein the base material is glass, paper or a resin material.

21. The conductive image according to claim 20, wherein the resin material is a biocompatible material.

22. The conductive image according to claim 21, wherein the biocompatible material comprises at least one kind selected from the group consisting of: gelatin; collagen; fibroin; cellulose; and chitosan.

23. The conductive image according to claim 20, wherein the resin material is a synthetic resin.

24. The conductive image according to claim 23, wherein the synthetic resin comprises at least one kind of resin selected from the group consisting of: polyester; polyurethane; polyolefin; polystyrene; acrylic; polyvinyl chloride; polyvinyl acetate; polyamide; polyimide; polycarbonate; epoxy; and an acrylonitrile-butadiene-styrene copolymer.

25. The conductive image according to claim 23, wherein the synthetic resin comprises at least one kind of resin selected from the group consisting of: polyester; polyolefin; polyimide; and polycarbonate.

* * * * *